US007333686B1

(12) United States Patent
Barbarossa et al.

(10) Patent No.: US 7,333,686 B1
(45) Date of Patent: Feb. 19, 2008

(54) SYSTEM AND METHOD FOR A RE-CONFIGURABLE OPTICAL CHANNEL DROPPING DE-MULTIPLEXER

(75) Inventors: Giovanni Barbarossa, Saratoga, CA (US); Ming Li, Pleasanton, CA (US); Song Peng, Pleasanton, CA (US)

(73) Assignee: Avanex Corporation, Fremont, CA (US)

(*) Notice: Subject to any disclaimer, the term of this patent is extended or adjusted under 35 U.S.C. 154(b) by 1158 days.

(21) Appl. No.: 10/442,576

(22) Filed: May 20, 2003

Related U.S. Application Data

(60) Provisional application No. 60/432,114, filed on Dec. 10, 2002.

(51) Int. Cl.
  G02B 6/02 (2006.01)
  G02B 6/28 (2006.01)
(52) U.S. Cl. .............................. 385/18; 385/31; 385/24
(58) Field of Classification Search ................. 385/18, 385/31, 24
  See application file for complete search history.

(56) References Cited

U.S. PATENT DOCUMENTS 5,757,529 A * 5/1998 Desurvire et al. .......... 398/178
5,995,259 A * 11/1999 Meli et al. .................. 398/92
6,018,404 A * 1/2000 Meli et al. .................. 398/1
6,292,605 B1 * 9/2001 Bisson et al. ............... 385/24
6,466,341 B1 * 10/2002 Lumish et al. ............. 398/82
6,529,307 B1 3/2003 Peng et al.

FOREIGN PATENT DOCUMENTS

JP 2003125430 * 4/2003

OTHER PUBLICATIONS

U.S. Appl. No. 60/432,114, Haijur Yuar et al., no date.

* cited by examiner

Primary Examiner—K. Cyrus Kianni
(74) Attorney, Agent, or Firm—Patterson & Sheridan, LLP

(57) ABSTRACT

A re-configurable channel dropping de-multiplexer comprises an input, an output, a first 1×2 optical switch optically coupled to the input, a second 1×2 optical switch optically coupled to the output, a plurality of 2×2 optical switches optically coupled between the first and second 1×2 optical switches, a plurality of inter-switch optical couplings optically coupled between each pair of adjacent optical switches, a plurality of channel band pass filter assemblies, each optically coupled between two optical switches and a plurality of channel drop ports, each channel drop port being optically coupled to a respective channel band pass filter assembly.

23 Claims, 18 Drawing Sheets

SYSTEM AND METHOD FOR A RE-CONFIGURABLE OPTICAL CHANNEL DROPPING DE-MULTIPLEXER

CROSS REFERENCE TO RELATED APPLICATIONS

This application relates to U.S. Provisional Application Ser. No. 60/432,114, filed on Dec. 10, 2002.

FIELD OF THE INVENTION

The present invention relates to optical channel dropping de-multiplexers utilized in optical communications systems. More particularly, the present invention relates to re-configurable optical channel dropping de-multiplexers, wherein a plurality of wavelength channels are dropped from a wavelength division multiplexed composite optical signal, wherein the dropped channels are directed to a plurality of dropped-channel lines such that ongoing transmission of non-dropped channels is not interrupted.

BACKGROUND OF THE INVENTION

Optical fibers are used extensively in telecommunications systems. It is often necessary to add or drop a wavelength channel in optical links or systems. Channel dropping can be achieved by a re-configurable channel dropping de-multiplexer. Such a de-multiplexer receives, from an input port, a wavelength division multiplexed composite optical signal that comprises several channels, or "wavelengths". These plural channels which include one or more "dropped channels" or wavelengths that a user wishes to remove, or "drop" to selected local channel drop ports, and other "express" channels that the user wishes to send, as a wavelength division multiplexed composite optical signal, to another destination.

FIG. 7 presents a known architecture re-configurable channel dropping system. A composite optical signal entering the re-configurable channel dropping system 700 from an input fiber optic line 701 is completely separated into its component channels $\lambda_1, \lambda_2, \ldots, \lambda_n$, by de-multiplexer 702. Assuming that the input composite optical signal comprises n channels, then, typically, the de-multiplexer 702 comprises a series of n optically coupled channel band pass filter assemblies, 704.1-704.$n$, wherein each channel band pass filter assembly transmits a different respective one of the channels and reflects other channels. By this method, the channels $\lambda_1, \lambda_2, \ldots, \lambda_n$ are completely separated and each such separated channel is directed to a respective one of the optical switches 706.1, 706.2, . . . , 706.$n$. Each of the switches 706.1-706.$n$ can direct a channel either to one of the optical drop lines 708 or to one of the optical lines 710 leading to the multiplexer 703. The multiplexer 703 works oppositely to the de-multiplexer 702 and comprises a second series of channel band pass filter assemblies 705.1-705.$n$ to receive the various express channels from the optical lines 710 and recombine these channels into a composite optical signal delivered to the output 714.

The known re-configurable channel dropping system 700 is re-configurable in the sense that the wavelengths that may dropped may be chosen at the discretion of the user. Although the conventional re-configurable channel dropping system 700 performs its intended function adequately, it requires one switch for each wavelength as well as two separate series of channel band pass filter assemblies. This type of configuration leads to large optical insertion losses, especially for the express channels, since each such express channel must pass through two channel band pass filter assemblies as well as an optical switch. Accordingly, there is a need in the art for an improved re-configurable channel dropping de-multiplexer system that does not require any of the express channels to be transmitted through a channel band pass filter. The present invention addresses such a need.

SUMMARY OF THE INVENTION

To address the above-noted needs in the art, an improved apparatus, system and method for a re-configurable optical channel dropping de-multiplexer is herein disclosed. A first exemplary re-configurable channel dropping de-multiplexer in accordance with the present invention comprises an optical input, an optical output, a first 1×2 optical switch optically coupled to the input, a second 1×2 optical switch optically coupled to the output, a plurality of 2×2 optical switches optically coupled between the first and second 1×2 optical switches, a plurality of inter-switch optical couplings optically coupled between each pair of adjacent optical switches, a plurality of channel band pass filter assemblies, a plurality of filter input couplings optically coupled between a respective channel band pass filter assembly and a logically preceding optical switch, a plurality of filter output couplings optically coupled between a respective one of the channel band pass filter assemblies and a logically following optical switch and a plurality of channel drop ports, wherein each channel drop port is optically coupled to a respective channel band pass filter assembly. Optionally, the first exemplary re-configurable channel dropping de-multiplexer may further comprise an n×p optical switch and a second plurality of channel drop ports, wherein each one of the n switch inputs comprising the n×p optical switch is optically coupled to a respective one of the channel drop ports and wherein each one of the p switch outputs comprising the n×p optical switch is optically coupled to a respective one of the second plurality of channel drop ports. Optionally, to improve channel isolation, each channel band pass filter assembly may be replaced by a pair of identical channel band pass filter assemblies linked in series by an additional coupling or may be replaced by a five-port channel band pass filter assembly through which non-dropped channels make two passes.

A second exemplary re-configurable channel dropping de-multiplexer in accordance with the present invention comprises an optical input, an optical output, an m×m optical switch optically coupled between the input and the output, a plurality of n channel band pass filter assemblies, wherein n=m−1, a plurality of filter input couplings that optically couple each channel band pass filter assembly to a respective switch output, a plurality of filter output couplings that optically couple each channel band pass filter assembly to a respective switch input and a plurality of channel drop ports, wherein each channel drop port is optically coupled to a respective channel band pass filter assembly. Optionally, the second exemplary re-configurable channel dropping de-multiplexer may further comprise an n×p optical switch and a second plurality of channel drop ports, wherein each one of the M switch inputs comprising the n×p optical switch is optically coupled to a respective one of the channel drop ports and wherein each one of the p switch outputs comprising the n×p optical switch is optically coupled to a respective one of the second plurality of channel drop ports. Optionally, to improve channel isolation, each channel band pass filter assembly may be replaced by a pair of identical channel band pass filter assemblies linked in series by an additional coupling or may be replaced by a five-port channel band pass filter assembly through which non-dropped channels make two passes.

An exemplary system for a re-configurable channel dropping de-multiplexer in accordance with the present invention comprises an optical input, a 3-dB optical splitter optically coupled to the input, a re-configurable channel dropping de-multiplexer, a first optical coupling between the 3-dB optical splitter and the re-configurable channel dropping de-multiplexer, a wavelength-selective channel attenuator, a second optical coupling between the 3-dB optical splitter and the wavelength-selective channel attenuator and an optical output optically coupled to the wavelength-selective channel attenuator. These and other specific variations and embodiments are more fully described in the following discussion.

DETAILED DESCRIPTION

The present invention provides an apparatus, system and method for a re-configurable optical de-multiplexer. The following description is presented to enable one of ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown but is to be accorded the widest scope consistent with the principles and features described herein. In order to gain a detailed understanding of the construction and operation of the present invention, the reader is referred to the appended FIGS. 1A-6D in conjunction with the following description.

Figure 1A:
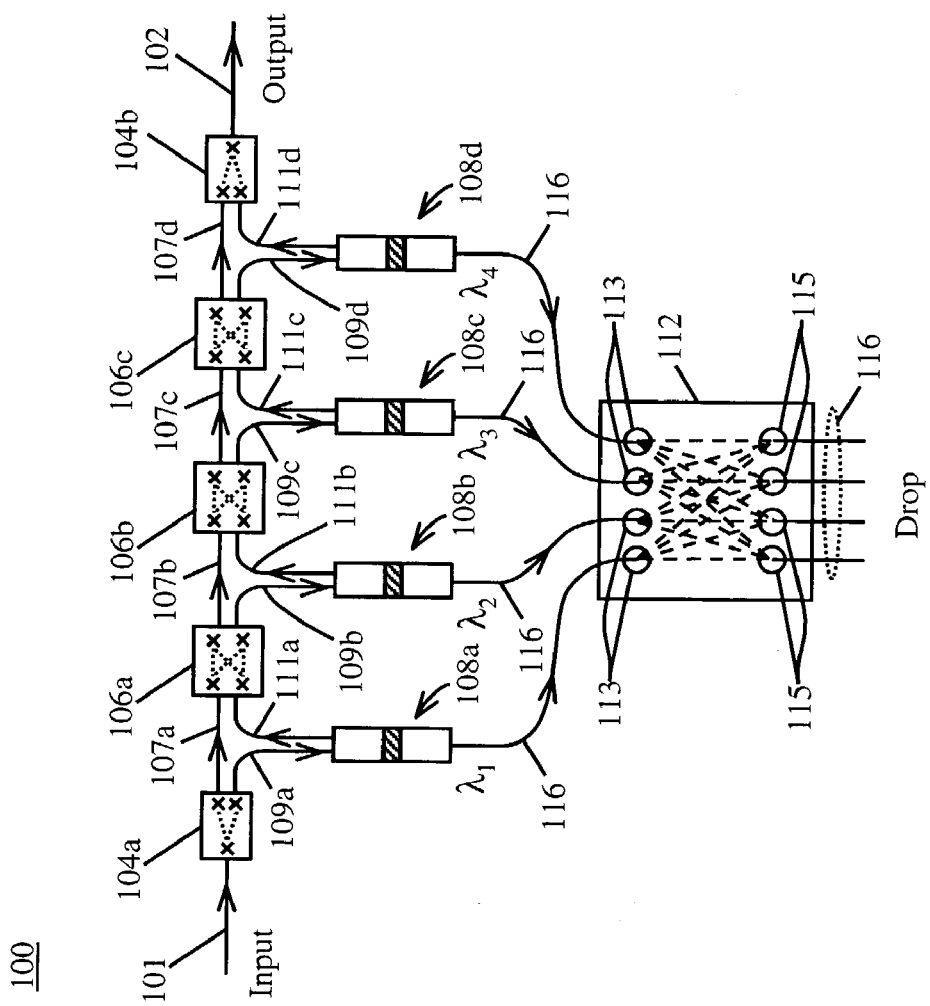
FIG. 1A is an illustration of a first preferred embodiment of a re-configurable channel dropping de-multiplexer in accordance with the present invention.

FIG. 1A is an illustration of a first preferred embodiment of a re-configurable channel dropping de-multiplexer in accordance with the present invention. The re-configurable channel dropping de-multiplexer 100 shown in FIG. 1A comprises an optical input 101, an optical output 102, a first 1×2 optical switch 104a optically coupled to the input 101, a second 1×2 optical switch 104b optically coupled to the output 102, a plurality of 2×2 optical switches 106a-106c optically coupled between the 1×2 optical switches 104a-104b, and a plurality of inter-switch optical couplings 107a-107d optically coupled between adjacent 2×2 optical switches 106a-106c or between the first 1×2 optical switch 104a and the 2×2 optical switch 106a or between the second 1×2 optical switch 104b and the 2×2 optical switch 106c. Additionally, the re-configurable channel dropping de-multiplexer 100 (FIG. 1A) comprises a plurality of channel band pass filter assemblies 108a-108d, a plurality of filter input couplings 109a-109d optically coupled between a respective channel band pass filter assembly 108a-108d and a logically preceding 1×2 first optical switch 104a or a logically preceding 2×2 optical switch, and a plurality of filter output couplings 111a-111d optically coupled between a respective one of the channel band pass filter assemblies 108a-108d and a logically following 2×2 optical switch or a logically following 1×2 second optical switch 104b. Each one of the channel band pass filter assemblies 108a-108d is also optically coupled to a respective channel drop port 116 of a plurality of channel drop ports. Note that, in this discussion, a 1×2 optical switch is taken to mean a switch either with one input and two selectable outputs or with two selectable inputs and one output. A switch having two selectable inputs and one output is also referred to as a 2×1 optical switch.

Optionally, the re-configurable channel dropping de-multiplexer 100 (FIG. 1A) may further comprise an n×p optical switch 112 and a second plurality of channel drop ports 116, wherein each one of the switch inputs 113 comprising the optical switch 112 is optically coupled to a respective one of the channel drop ports 116 and wherein each one of the switch outputs 115 comprising the optical switch 112 is optically coupled to respective one of the second plurality of channel drop ports 116.

In general, the re-configurable channel dropping de-multiplexer 100 comprises a general number, n, of channel band pass filter assemblies wherein each such channel band pass filter assembly transmits or passes therethrough a certain respective channel and reflects all other channels. The channel transmitted through each one of the channel band pass filter assemblies is different from the channel transmitted through every other channel band pass filter assembly. For clarity of presentation, only four such channel band pass filter assemblies 108a-108d are illustrated in FIG. 1A (that is, n=4). However, the total number, n, of such channel band pass filter assemblies is not be interpreted as being limited to four or to any other particular number.

Each one of the channel band pass filter assemblies 108a-108d comprising the re-configurable channel dropping de-multiplexer 100 shown in FIG. 1A preferably comprises a thin-film optical band pass filter together with associated collimating and focusing lenses. Such an assembly is well-known in the art. Preferably, each one of the filter input couplings 109a-109d and filter output couplings 111a-111d comprises an optical fiber. Further, the input 101, output 102, any one or more of the inter-switch couplings 107a-107d and any one or more of the channel drop ports 116 may comprise optical fibers. Alternatively, any one of these components 101, 102, 107a-107d, 109a-109d, 111a-111d, and 116, may comprise any alternative known form of optical coupling comprising waveguides or bulk optics.

The number, n, of inputs to the n×p optical switch 112, if such optional optical switch is present, is equivalent to the number of channel drop ports 116 comprising the plurality of channel drop ports and is thus equivalent to the number of channel filter assemblies. Accordingly, the optical switch 112 shown in FIG. 1A, if present, comprises four inputs. Accordingly, assuming n=4, the re-configurable channel dropping de-multiplexer 100 comprises three 2×2 switches 106a-106c, four inter-switch optical couplings 107a-107d, four filter input couplings 109a-109d, four filter output couplings 111a-111d and four channel drop ports 116 optically coupled to the switch inputs 113, if the switch 112 is present, as shown in FIG. 1A.

The re-configurable channel dropping de-multiplexer 100 (FIG. 1A) may further comprise a general number, p, of channel drop ports within the second plurality of channel drop ports 116, wherein each such channel drop port of the second plurality of channel drop ports is optically coupled to a respective one of the p outputs 115 comprising the optical switch 112. Generally, but not necessarily, the number of channel drop ports in the plurality of channel drop ports or the second plurality of channel drop ports will be equal to the maximum possible number of dropped channels, which, in turn, is equal to the number of channel band pass filter assemblies. Accordingly, in the example shown in FIG. 1A, the number p of channel drop ports is also equal to four.

In operation of the re-configurable channel dropping de-multiplexer 100 (FIG. 1A), either the first 1×2 optical switch 104a or any one of the 2×2 optical switches 106a-106c may or may not, depending upon its controlled switch state, route a composite optical signal to the logically following channel band pass filter assembly of the plurality of channel band pass filter assemblies 108a-108d. If a particular switch does not route a composite optical signal to the logically following channel band pass filter assembly (that is to say, the channel band pass filter assembly is bypassed), then this composite optical signal is routed, via one of the inter-switch optical couplings 107a-107d, to a subsequent one of the 2×2 optical switches 106a-106c or to the second 1×2 optical switch 104b. Each channel band pass filter assembly separates a particular respective channel, which is a channel to be dropped, from the remaining channels by transmitting the particular channel and reflecting the remaining channels. The switch state configurations are under the control of the user so that any particular channel may or may not be separated from the composite optical signal and delivered to one of the channel drop ports 116. All non-dropped, or express, channels pass through to the optical output 102. Only channels that may pass through one of the channel band pass filter assemblies 108a-108d may be dropped.

For instance, if it is desired to drop the channel $\lambda_1$, then the first 1×2 optical switch 104a must be configured so as to route an optical signal from the input 101 through to the channel band pass filter assembly 108a via filter input coupling 109a. The channel band pass filter assembly passes the channel $\lambda_1$ to a channel drop port and reflects all other channels back to the switch output coupling 111a and then to the 2×2 switch 106a. If it is further desired to drop the channel $\lambda_2$, then the 2×2 switch 106a must be configured so as to route these reflected channels from filter output coupling 111a to the next filter input coupling 109b and then to the next channel band pass assembly 108b. In this instance, the channel band pass assembly 108b transmits the channel $\lambda_2$ to a channel drop port 116 and reflects all other channels—the original channels except for channels $\lambda_1$ and $\lambda_2$—to the second filter output coupling 111b. Alternatively, if it is desired not to drop channel $\lambda_2$, then the 2×2 switch 106a is configured so as to route the channels received from filter output coupling 111a to the next 2×2 optical switch 106b via the inter-switch optical coupling 107b. In this latter case, the channel band pass filter assembly 108b is bypassed and the $\lambda_2$ channel is not dropped.

Through simple inspection of FIG. 1A together with application of the basic operating principles just discussed, it may be seen that, through proper choice of the settings of the 1×2 switches 104a-104b and the 2×2 switches 106a-106c, any one or more of the channels $\lambda_1$-$\lambda_4$ may be dropped or not dropped as desired. Any non-dropped channels proceed through the second 1×2 switch 104b to the output 102. Each dropped channel is routed to one of the channel drop ports 116. Optionally, if the switch 112 is present, each dropped channel may be re-routed to any desired one of the switch outputs 115 and then to any one of the channel drop ports 116 comprising the second plurality of channel drop ports. In this fashion, the apparatus 100 functions as a re-configurable channel dropping de-multiplexer. It is to be noted (see, for instance, FIG. 1A) that each 2×2 switch comprises a first input that is optically coupled to a first inter-switch optical coupling, a second input that is optically coupled to a filter output coupling, a first output that is optically coupled to a second inter-switch optical coupling and a second output that is optically coupled to a filter input coupling. Using these definitions, then the notation "bar" refers to the configuration of a 2×2 switch that either routes an optical signal from the first input to the first output or from the second input to the second output. Likewise, the notation "cross-up" refers to the configuration of a 2×2 switch that routes an optical signal from the second input to the first output and the notation "cross-down" refers the configuration of a 2×2 switch that routes an optical signal from the first input to the second output. To more fully and particularly describe the full operational capabilities of the re-configurable channel dropping de-multiplexer 100, the channels dropped for each switch configuration are summarized in the following Table.

of columns, wherein each reflector within a particular column may direct optical output to a respective one the switch outputs 115. The individual reflectors 202 may be fabricated using Micro-ElectroMechanical (MEMS) or micro-fluidic (i.e., "bubble") technology or may comprise ordinary bulk mirrors. Each of the reflectors 202 may assume one of two positions or states—an "on" position or state whereby the reflector is disposed within the path of light comprising a channel so as to deflect light at a particular angle—generally a right angle—and an "off" position or state whereby the channel light does not encounter the reflector. The position of each reflector, which determines whether the reflector is

| Channels Dropped | 1 × 2 switch | 2 × 2 switch | 2 × 2 switch | 2 × 2 switch | 2 × 1 switch |
|---|---|---|---|---|---|
| None | Input -> 1st output | 1st input - bar - first output | 1st input - bar - first output | 1st input - bar - first output | 1st input - output |
| 1 | Input -> 2nd output | 2nd input - cross-up - first output | 1st input - bar - first output | 1st input - bar - first output | 1st input - output |
| 2 | Input -> 1st output | 1st input - cross-down - second output | 2nd input - cross-up - first output | 1st input - bar - first output | 1st input - output |
| 3 | Input -> 1st output | 1st input - bar - first output | 1st input - cross-down - second output | 2nd input - cross-up - first output | 1st input - output |
| 4 | Input -> 1st output | 1st input - bar - first output | 1st input - bar - first output | 1st input - cross-down - second output | 2nd input - output |
| 1, 2 | Input -> 2nd output | 2nd input - bar - second output | 2nd input - cross-up - first output | 1st input - bar - first output | 1st input - output |
| 1, 3 | Input -> 2nd output | 2nd input - cross-up - first output | 1st input - cross-down - second output | 2nd input - cross-up - first output | 1st input - output |
| 1, 4 | Input -> 2nd output | 2nd input - cross-up - first output | 1st input - bar - first output | 1st input - cross-down - second output | 2nd input - output |
| 2, 3 | Input -> 1st output | 1st input - cross-down - second output | 1st input - bar - second output | 2nd input - cross-up - first output | 1st input - output |
| 2, 4 | Input -> 1st output | 1st input - cross-down - second output | 2nd input - cross-up - first output | 1st input - cross-down - second output | 2nd input - output |
| 1, 2, 3 | Input -> 2nd output | 2nd input - bar - second output | 2nd input - bar - second output | 2nd input - cross-up - first output | 1st input - output |
| 1, 2, 4 | Input -> 2nd output | 2nd input - bar - second output | 2nd input - cross-up - first output | 1st input - cross-down - second output | 2nd input - output |
| 1, 3, 4 | Input -> 2nd output | 2nd input - cross-up - first output | 1st input - cross-down - second output | 2nd input - bar - second output | 2nd input - output |
| 2, 3, 4 | Input -> 1st output | 1st input - cross-down - second output | 2nd input - bar - second output | 2nd input - bar - second output | 2nd input - output |
| 1, 2, 3, 4 | Input -> 2nd output | 2nd input - bar - second output | 2nd input - bar - second output | 2nd input - bar - second output | 2nd input - output |

Figure 2:
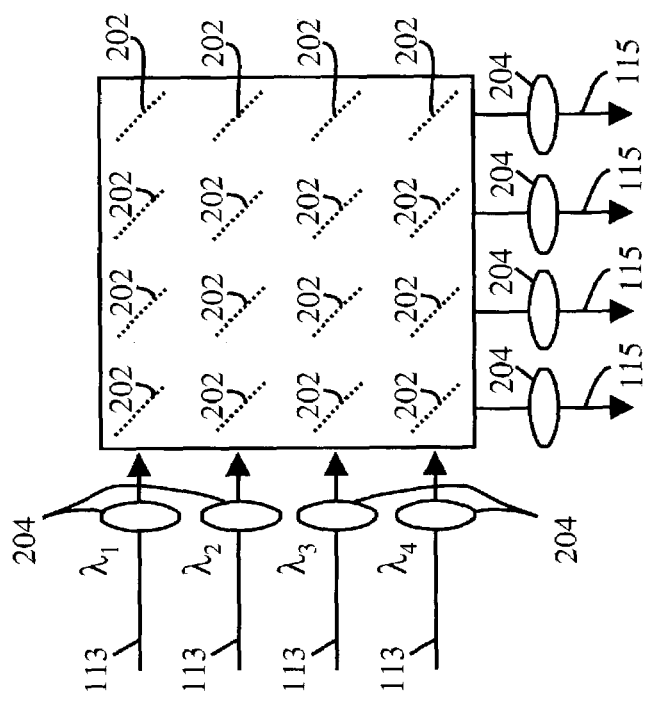
FIG. 2 is an illustration of a 4×4 optical switch suitable for use within an embodiment of a re-configurable channel dropping de-multiplexer in accordance with the present invention.

Referring now to FIG. 2, there is provided an illustration of a 4×4 switch 112.1 that may be utilized within a re-configurable channel dropping de-multiplexer in accordance with the present invention. For instance, the switch 112.1 may be utilized as the switch 112 shown in FIG. 1A. The 4×4 switch 112.1 (FIG. 2) comprises a plurality of reflectors 202 organized in a physical matrix format. The matrix comprises a plurality of rows, wherein each reflector within a particular row may receive an optical signal from a respective one of the switch inputs 113. The matrix also comprises a plurality in its "on" or "off" state, may be controlled for each reflector by, for instance, motors or actuators and mechanical linkages (not shown).

In the 4×4 switch 112.1 (FIG. 2), an optical signal may be received from each of the switch inputs 113. Each switch input 113 is optically coupled to a lens 204. Each optical signal entering the switch 112.1 from one of the switch inputs 113 is collimated by a respective lens 204. Each of the sixteen reflectors 202 comprising the 4×4 switch 112.1 (FIG. 2), lies within one unique column and one unique row. When a reflector is in its "on" position or state, it deflects the path of one optical signal propagating along the row so as to subsequently propagate along the column. The collimated light of this deflected optical signal then propagates along the column without encountering any other reflectors in an "on" state until it encounters a lens 204 adjacent to one of the switch outputs 115. This lens focuses the light into the adjacent switch output 115 at which it then exits the 4×4 switch 112.1.

Figure 1B:
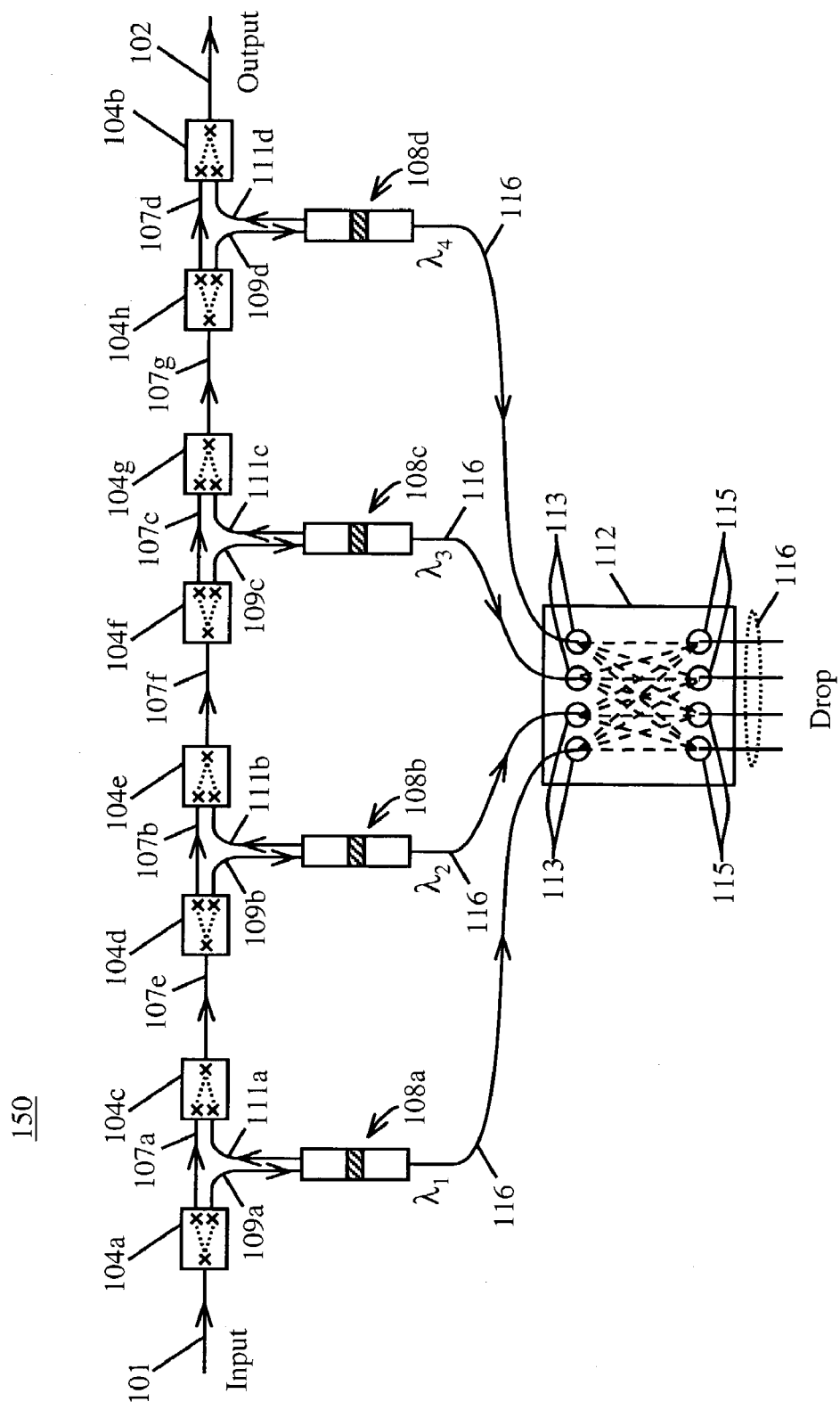
FIG. 1B is an illustration of a second preferred embodiment of a re-configurable channel dropping de-multiplexer in accordance with the present invention.

Referring now to FIG. 1B, there is provided an illustration of a second preferred embodiment of a re-configurable channel dropping de-multiplexer in accordance with the present invention. The re-configurable channel dropping de-multiplexer 150 shown in FIG. 1B is similar to the re-configurable channel dropping de-multiplexer 100 (FIG. 1A) except that each 2×2 switch is replaced by a pair of 1×2 optical switches and an additional inter-switch optical coupling between said two switches. Therefore, assuming that the re-configurable channel dropping de-multiplexer 150 comprises the same four channel band pass filter assemblies 108a-108d and other components previously described, the additional components comprise the six 1×2 optical switches 104c-104h and the three inter-switch optical couplings 107e-107g. In view of the prior discussion relating to FIG. 1A, the operation of the re-configurable channel dropping de-multiplexer 150 is obvious.

Figure 1C:
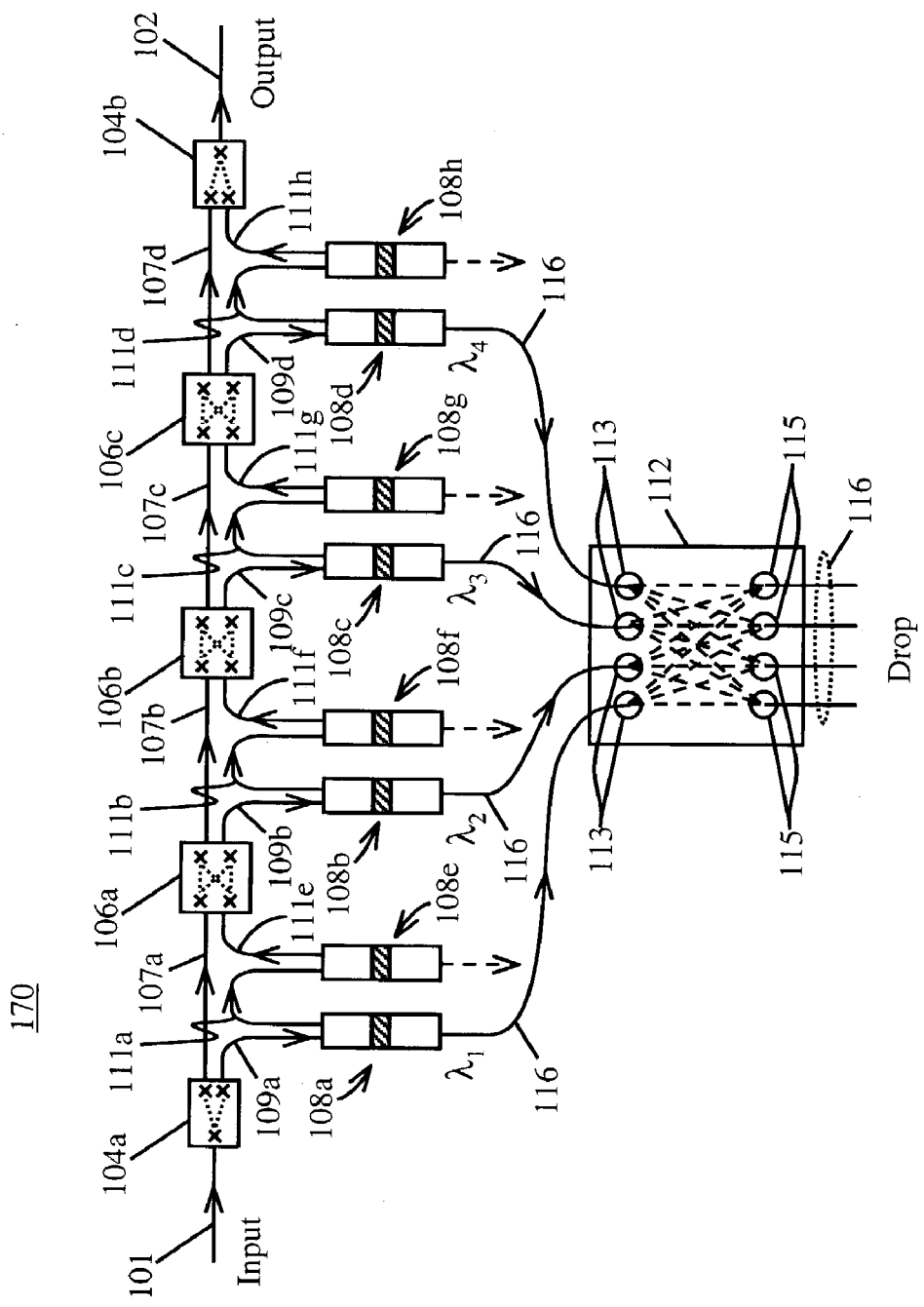
FIG. 1C is an illustration of a third preferred embodiment of a re-configurable channel dropping de-multiplexer in accordance with the present invention.

FIG. 1C is an illustration of a third preferred embodiment of a re-configurable channel dropping de-multiplexer in accordance with the present invention. The re-configurable channel dropping de-multiplexer 170 shown in FIG. 1C comprises all the same components previously discussed in relation to the re-configurable channel dropping de-multiplexer 100 (FIG. 1A). Additionally, the re-configurable channel dropping de-multiplexer 170 comprises an additional set of channel band pass filter assemblies 108e-108h, and an additional set of filter output couplings 111e-111h configured as shown in FIG. 1C. The channel band pass filter assembly 108e is identical to the channel band pass filter assembly 108a. Likewise, the channel band pass filter assemblies 108f, 108g and 108h are identical to the channel band pass filter assemblies 108b, 108c and 108g, respectively. The filter output coupling 111a within the apparatus 170 is not optically coupled to the 2×2 switch 106a as it is within the apparatus 100 but is, instead, optically coupled to the channel band pass filter assembly 108e. Likewise, the filter output couplings 111b, 111c and 111d are optically coupled to the channel band pass filter assemblies 108f, 108g and 108h, respectively. Further, the filter output coupling 111e is optically coupled between the channel band pass filter assembly 108e and the first 2×2 switch 106a. In like fashion, the filter output couplings 111f, 111g and 111h are respectively optically coupled between the channel band pass filter assembly 108f and the second 2×2 switch 106b, between the channel band pass filter assembly 108g and the third 2×2 switch 106c, and between the channel band pass filter assembly 108h and the second 1×2 switch 104b.

As shown in FIG. 1C, the band pass filter assemblies are optically coupled in pairs, via the filter output couplings 111a-111d, such that any channels that are not transmitted through the first channel band pass filter of any pair are delivered to the second channel band pass filter of the same pair prior to being directed to a subsequent optical switch. The two band pass filter assemblies comprising any pair are identical to one another, in the sense that they both transmit the same wavelength channel. For instance, the channel band pass filter assemblies 108a and 108e comprise such a pair and both members of this pair transmit the channel $\lambda_1$ and reflect all other channels. Likewise, both of the channel band pass filter assemblies 108b and 108f transmit the channel 2 and reflect all other channels, both of the channel band pass filter assemblies 108c and 108g transmit the channel $\lambda_3$ and reflect all other channels, etc.

The sequential pair arrangement of channel band pass filter assemblies shown in FIG. 1C purifies the express channels by eliminating any remaining proportion of any of the dropped channels. For instance, assuming that the channel $\lambda_1$ is to be dropped, then, even though most of the optical power of the channel $\lambda_1$ is transmitted through the channel band pass filter assembly 108a, a small proportion of this optical power may remain and contaminate the express channels that are reflected to the filter output coupling 111a. However, upon interaction with the next band pass filter assembly 108e, this contaminating proportion of the channel $\lambda_1$ is substantially removed, since it is transmitted through the band pass filter assembly 108e and is discarded whereas the express channels are reflected to the filter output coupling 111e. These express channels are then substantially free of any contamination by channel $\lambda_1$. Similarly, any contaminating portions of other dropped channels may be eliminated at other pairs of channel band pass filter assemblies.

Figure 1D:
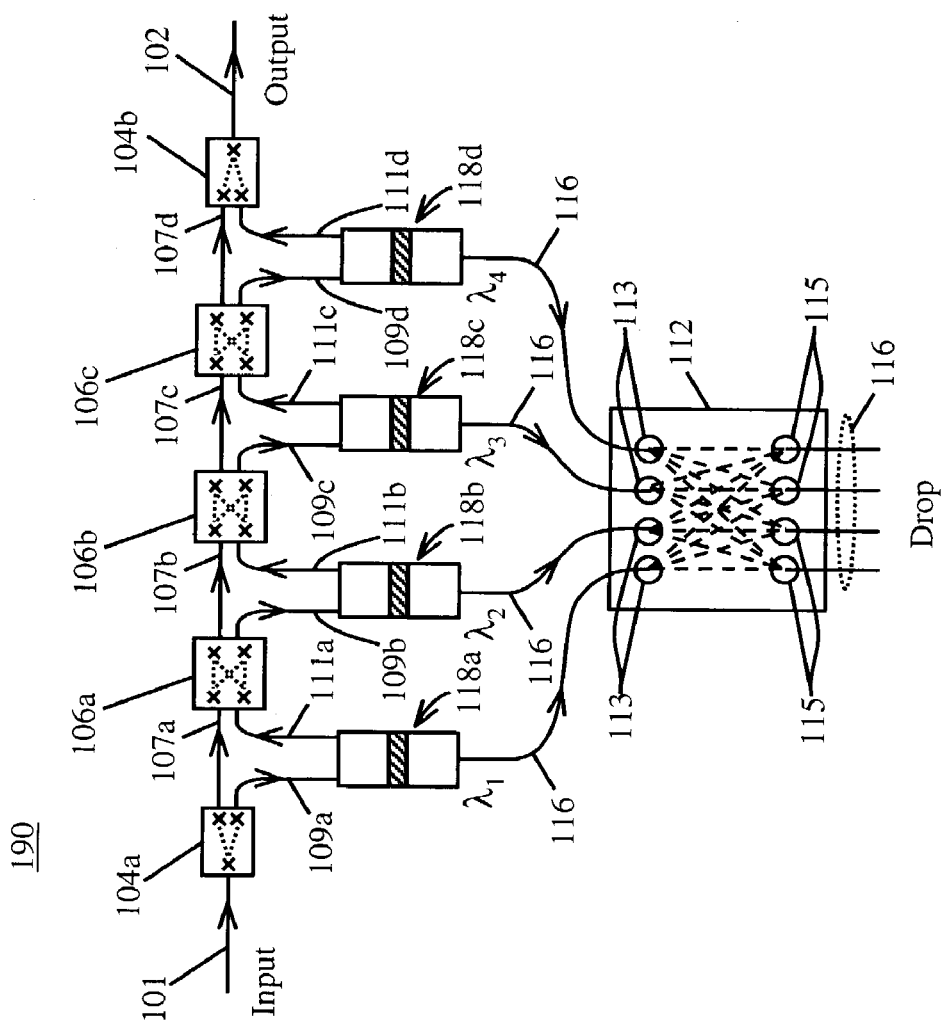
FIG. 1D is an illustration of a fourth preferred embodiment of a re-configurable channel dropping de-multiplexer in accordance with the present invention.
Figure 1E:
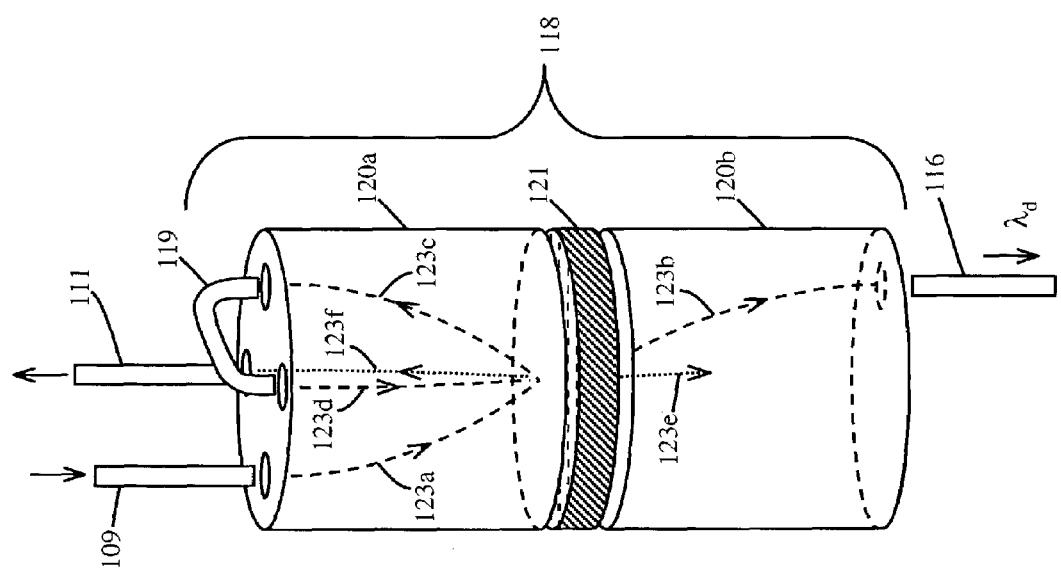
FIG. 1E is an illustration of a five-port channel band pass filter assembly that may be utilized within the re-configurable channel dropping de-multiplexer in accordance with the present invention.

FIG. 1D is an illustration of a fourth preferred embodiment of a re-configurable channel dropping de-multiplexer in accordance with the present invention. FIG. 1E is an exemplary five-port channel band pass filter assembly 118 as utilized within the re-configurable channel dropping de-multiplexer 190 shown in FIG. 1D. The re-configurable channel dropping de-multiplexer 190 shown in FIG. 1D comprises similar components to those components previously discussed in relation to the re-configurable channel dropping de-multiplexer 100 (FIG. 1A). However, within the re-configurable channel dropping de-multiplexer 190, each of the channel band pass filter assemblies 118a-118d comprises a five-port channel band pass filter assembly, such as is shown as five-port channel band pass filter assembly 118 in FIG. 1E.

The design of the five-port channel band pass filter assembly 118 (FIG. 1E) permits express channels to undergo two consecutive passes through each such filter assembly. These two consecutive passes purify the express channels by eliminating any remaining proportion of a dropped channel that is not completely transmitted through the filter assembly during the first pass. The exemplary five-port channel band pass filter assembly 118 shown in FIG. 1E comprises a first lens 120a and an inter-port coupling 119 optically coupled to the first lens. The band pass filter assembly 18 further comprises a thin-film optical filter 121 optically coupled to the first lens 120a at a side opposite to the inter-port coupling 119 and a second lens 120b optically coupled to the thin-film optical filter 121 at a side opposite to the first lens 120a. Also shown, for clarity, in FIG. 1E are a filter input coupling 109, a filter output coupling 111 and a channel drop port 116.

The filter input coupling 101 and filter output coupling 111 are optically coupled to the first lens 120a of the five-port channel band pass filter assembly 118 (FIG. 1E) at a side opposite to the thin-film filter, which is the same side at which the inter-port coupling 119 is optically coupled to the same lens. The channel drop port 116 is optically coupled to the second lens 120b at a side opposite to the thin-film filter 121. The filter input coupling 109 shown in FIG. 1E is representative of any of the filter input couplings 109a, 109b, etc. shown in FIG. 1D; the filter output coupling 111 of FIG. 1E is representative of any of the filter input couplings 111a, 111b, etc. shown in FIG. 1D. Preferably, the inter-port coupling 119 comprises an optical fiber and each of the lenses 120a-120b comprises a well-known GRIN lens. Each of the five-port channel band pass filter assemblies 118a-118d shown in FIG. 1D are similar to the band pass filter assembly shown in FIG. 1E except that the thin-film filter comprising each such five-port channel band pass filter assembly 118a-118d passes or transmits a different respective wavelength. Thus, the five-port channel band pass filter assemblies 118a-118d respectively can transmit and drop the channels $\lambda_1$-$\lambda_4$.

Referring, once again, to FIG. 1E, a multiple-channel wavelength-division multiplexed composite optical signal is delivered to the five-port channel band pass filter assembly 118 from the filter input coupling 109 and enters the first lens 120a, wherein it is collimated and follows pathway 123a to the thin-film filter 121. The filter 121 transmits a dropped channel or wavelength $\lambda_d$ and reflects other, express channels. The dropped channel $\lambda_d$ follows pathway 123b within the second lens 120b and is focused and output to the channel drop port 116. The reflected express channels follow the pathway 123c within the first lens 120a whereby they are focused into the inter-port coupling 119. The inter-port coupling 119 then returns these channels back to the first lens 120a wherein they are collimated and follow pathway 123d back to the thin-film filter 121 a second time. After their first reflection (that is, to pathway 123c) at the filter 121, the express channels may yet contain a small contaminating proportion of the dropped channel $\lambda_d$. Upon a second interaction with the filter 121, this contaminating proportion of the channel $\lambda_d$ is substantially removed from the express channels, since the contaminating proportion is transmitted through the filter 121 to pathway 123e from which it is discarded. The express channels are reflected once to pathway 123f and then are focused to the filter output coupling 111.

Figure 3A:
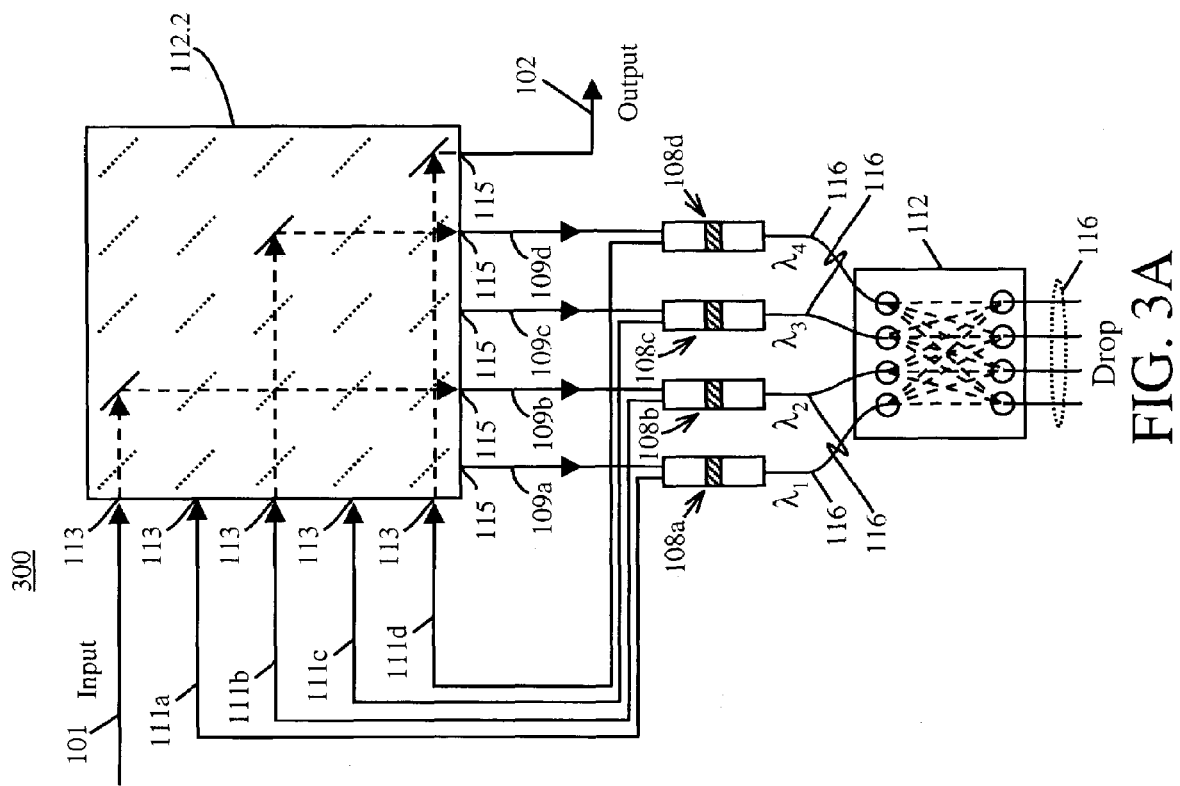
FIG. 3A is an illustration of a fifth preferred embodiment of a re-configurable channel dropping de-multiplexer in accordance with the present invention.

FIG. 3A is an illustration of a fifth preferred embodiment of a re-configurable channel dropping de-multiplexer in accordance with the present invention. Assuming, for illustration purposes only, that the re-configurable channel dropping de-multiplexer 300 (FIG. 3A) is capable of dropping just the four channels $\lambda_1$-$\lambda_4$—that is, n=4, then the re-configurable channel dropping de-multiplexer 300 comprises an optical input 101, an optical output 102, a 5×5 optical switch 112.2 optically coupled between the input 101 and the output 102 and a plurality of channel band pass filter assemblies 108a-108d that are all optically coupled to a respective switch output 115 of the 5×5 optical switch 112.2 via a respective one of a plurality of filter input couplings 109a-109d and that are all optically coupled to a respective switch input 113 of the 5×5 optical switch 112.2 via a respective one of a plurality of filter output couplings 111a-111d. Each channel band pass filter assembly is also optically coupled to a respective channel drop port 116 of a plurality of channel drop ports. Optionally, the re-configurable channel dropping de-multiplexer 300 may further comprise a 4×p optical switch 112, as well as a second plurality of channel drop ports 116 as previously described. The single optical input 101 and each one of the four filter output couplings 111a-111d are optically coupled to a respective one of the five switch inputs 113 of the 5×5 optical switch 112.2. The single optical output 102 and each one of the four filter input couplings 109a-109d are optically coupled to a respective one of the five switch outputs 115 of the 5×5 optical switch 112.2. Although not specifically shown in FIG. 3A, it is to be kept in mind that each channel band pass filter assembly of the re-configurable channel dropping de-multiplexer 300 may be replaced by a pair of identical channel band pass filter assemblies optically coupled in series, as previously described in reference to FIG. 1C or by a five-port channel band pass filter assembly as previously described in reference to FIGS. 1D-1E.

The operation of the re-configurable channel dropping de-multiplexer 300 shown in FIG. 3A may be understood by comparison to the re-configurable channel dropping de-multiplexer 100 (FIG. 1A). By comparison of FIG. 3A with FIG. 1A, it may be observed that the two apparatuses are related by replacement of the 2×1 optical switches 104a-104b and the 2×2 optical switches 106a-106c by the single 5×5 switch 112.2. It may be noted that, within the re-configurable channel dropping de-multiplexer 100 (FIG. 1A), the express channels propagate either (a) from a first one of the optical switches to a channel band pass filter assembly and then back to a second one of the optical switches or, alternatively (b) from the first one the optical switches to the second one of the optical switches. By contrast, within the re-configurable channel dropping de-multiplexer 300 (FIG. 3A), the express channels propagate either (a) from the single 5×5 optical switch 112.2 to a channel band pass filter assembly and then back to the same 5×5 optical switch 112.2 or, alternatively (b) from the optical switch 112.2 directly to the output 102. The channel band pass filter assemblies 108a-108d, filter input couplings 109a-109d, filter output couplings 111a-111d, optional optical switch 112 and channel drop ports 116 are common between the re-configurable channel dropping de-multiplexer 100 and the re-configurable channel dropping de-multiplexer 300 and perform similar functions within the two apparatuses.

The operation of the re-configurable channel dropping de-multiplexer 300 may be further understood with reference to an example express-channel pathway, shown as dashed lines in FIG. 3A. For instance, in the example shown in FIG. 3A, it is assumed that the user wishes to drop just the two channels $\lambda_2$ and $\lambda_4$. In this case, a composite optical signal entering the first switch input 113 of the 5×5 optical switch 112.2 from the input 101 is directed, within the switch, to the second switch output 115 and the second filter input coupling 109b and then to the second channel band pass filter assembly 108b. The channel band pass filter assembly 108b transmits the $\lambda_2$ channel therethrough and reflects all other channels to the second filter output coupling 111b. The second filter output coupling 111b directs these other channels to the third switch input 113 of the optical switch 112.2, to which it is optically coupled. These other channels are then directed, within the optical switch 112.2, to the fourth switch output 115 and the fourth filter input coupling 109d and then to the fourth channel band pass filter assembly 108d. The channel band pass filter assembly 108d transmits the $\lambda_4$ channel therethrough and reflects all other channels to the fourth filter output coupling 111d. The fourth filter output coupling 111d directs these twice filtered channels-comprising all the channels originally delivered from the input 101 except for $\lambda_2$ and $\lambda_4$—to the fifth switch input 113 of the optical switch 112.2, to which it is optically coupled. The optical switch 112.2 then directs these optical channels to the output 102.

The re-configurable channel dropping de-multiplexer 300 (FIG. 3A) possesses an advantage, relative to the previously described embodiments, of reducing the number of separate optical components with which the express channels are required to interact during their passage from the input 101 to the output, thereby reducing overall insertion loss incurred by the express channels. The design of the re-configurable channel dropping de-multiplexer 300 also provides for easy upgrade to greater numbers of dropped channels as further discussed in the following paragraphs and illustrated in FIGS. 3B-3C.

Figure 3B:
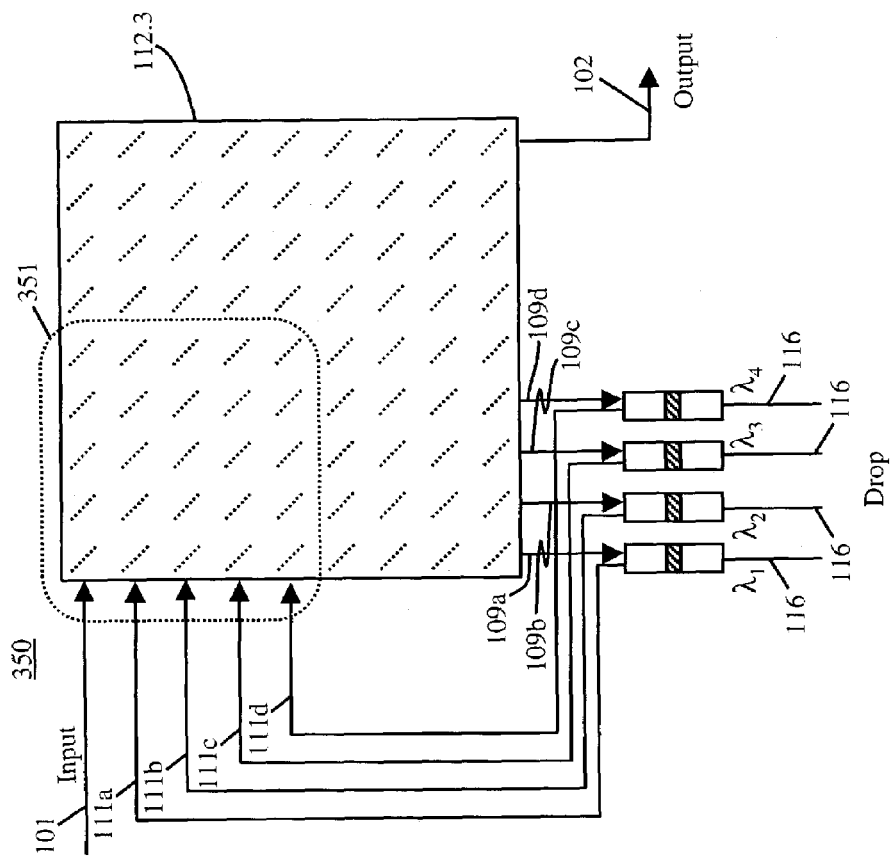
FIG. 3B is an illustration of a sixth preferred embodiment of a re-configurable channel dropping de-multiplexer in accordance with the present invention.

FIG. 3B is an illustration of a sixth preferred embodiment of a re-configurable channel dropping de-multiplexer in accordance with the present invention. The re-configurable channel dropping de-multiplexer 350, as shown in FIG. 3B, operates identically to the re-configurable channel dropping de-multiplexer 300, shown in FIG. 3A. However, in the re-configurable channel dropping de-multiplexer 350, the 9×9 optical switch 112.3 replaces the 5×5 optical switch 112.2 comprising the re-configurable channel dropping de-multiplexer 300 (FIG. 3A). More generally, if the number of channel band pass filter assemblies is denoted by n, then the optical switch 112.2 comprising the re-configurable channel dropping de-multiplexer 300 comprises an m×m switch, wherein m=n+1 and the optical switch 112.3 comprising the re-configurable channel dropping de-multiplexer 350 comprises a q×q switch, wherein q=2n+1.

The box 351 shown in FIG. 3B, which is not to be taken as a physical component of the invention, outlines a sub-portion of the optical switch 112.3 that corresponds to the optical switch 112.2. Since, in the examples shown in both FIGS. 3A-3B, four channel band pass filter assemblies are utilized, the switch 112.2 comprises a 5×5 switch and the switch 112.3 comprises a 9×9 switch. As shown, in FIG. 3B, only the 5×5 sub-portion of the switch 112.3 shown in box 351 is utilized, and, thus, the re-configurable channel dropping de-multiplexer 350 operates identically to the re-configurable channel dropping de-multiplexer 300.

Figure 3C:
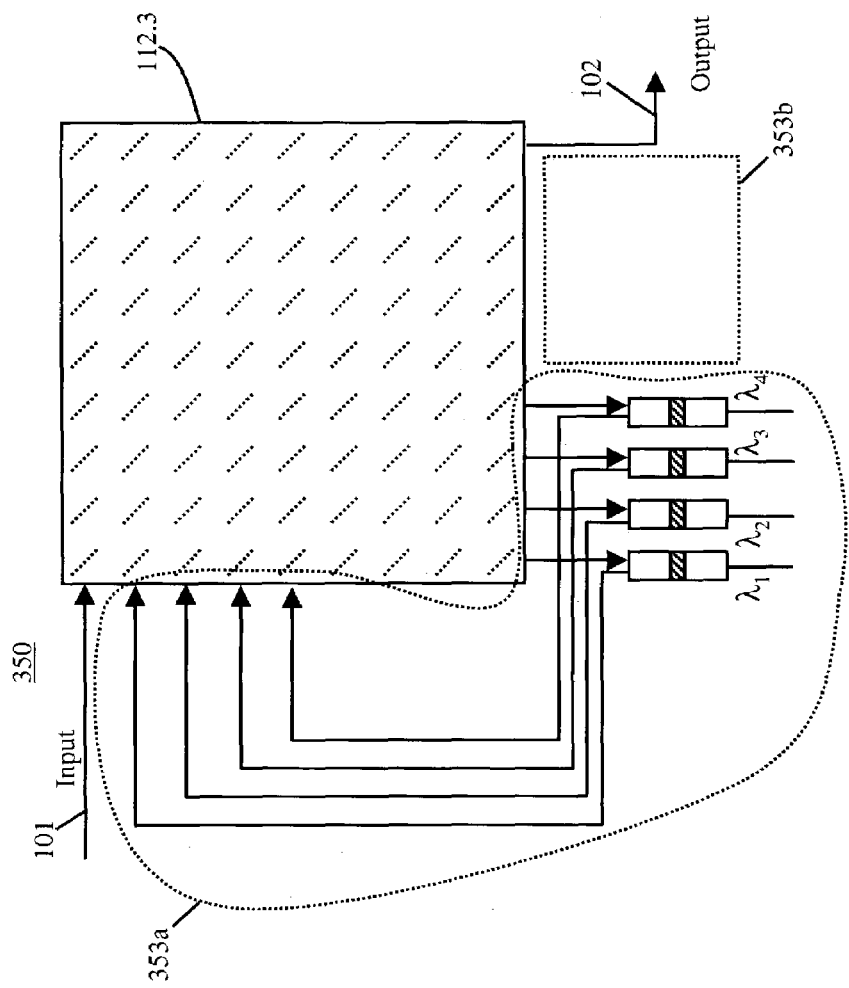
FIG. 3C is an illustration of the re-configurable channel dropping de-multiplexer of FIG. 3B shown in an upgrade configuration.

The "unused" portion of the 9×9 optical switch 112.3 shown in FIG. 3B is reserved for upgrade for use with a greater total number of channel band pass filter assemblies and, therefore, a capability for dropping a greater number of channels. This upgrade capability is demonstrated in FIG. 3C. In FIG. 3C, all of the aforementioned channel band pass filter assemblies 108a-108d, filter input couplings 109a-109d, filter output couplings 111a-111d and channel drop ports 116 are grouped together as component group 353a. The component group 353a may be reproduced as the upgrade component group 353b (for simplicity, shown as a box only, without illustration of the individual components), which is identical to component group 353a except that the individual channel band pass filter assemblies of upgrade component group 353b are chosen so as transmit the channels $\lambda_5$, $\lambda_6$, $\lambda_7$ and $\lambda_8$, respectively.

The upgrade component group 353b provides a second group of four channel drop ports that can drop the channels $\lambda_5$, $\lambda_6$, $\lambda_7$ and $\lambda_8$. The operation of the upgrade component group is obvious from the preceding discussion concerning the re-configurable channel dropping de-multiplexer 300. Whereas the filter output couplings comprising the component group 353a are optically connected to the 2nd through the 5th switch inputs of the switch 112.3, the filter output couplings comprising the upgrade component group 353b are optically connected to the 6th through the 9th switch inputs of this switch. Further, whereas the filter input couplings comprising the component group 353a are optically connected to the 1st through the 4th switch outputs of the switch 112.3, the filter input couplings comprising the upgrade component group 353b are optically connected to the 5th through the 8th switch inputs of this switch. In this fashion, the re-configurable channel dropping de-multiplexer is upgraded from a four-channel to an eight-channel dropping capability.

Figure 4:
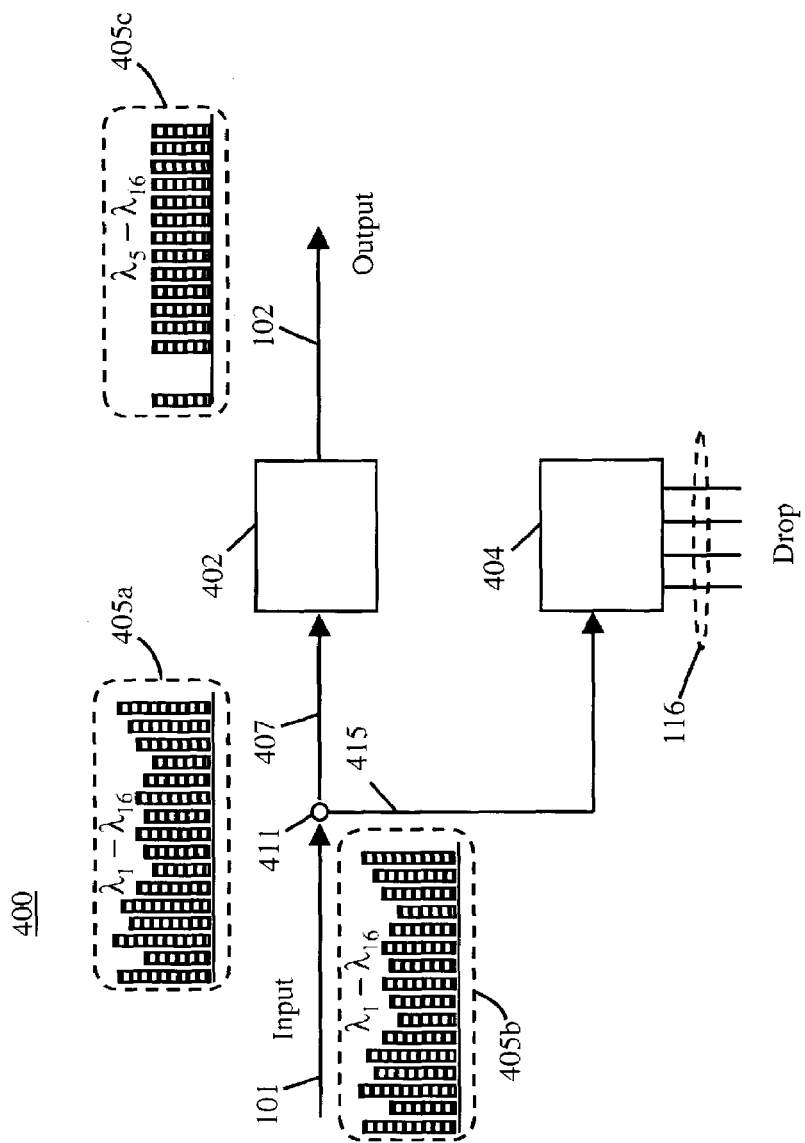
FIG. 4 is an illustration of a first preferred system for a re-configurable channel dropping de-multiplexer in accordance with the present invention.

FIG. 4 is a diagram of a first preferred system for a re-configurable channel dropping de-multiplexer in accordance with the present invention. The re-configurable channel dropping de-multiplexer system 400 provides the capability of balancing the output powers of the express channels, in addition to the channel dropping described previously. As shown in FIG. 4, the re-configurable channel dropping de-multiplexer system 400 comprises an optical input 101, a 3-dB optical splitter 411 optically coupled to the input 101 and a re-configurable channel dropping de-multiplexer 404, wherein the re-configurable channel dropping de-multiplexer 404 is optically coupled to the 3-dB optical splitter 411 via a first optical coupling 415. The re-configurable channel dropping de-multiplexer system 400 further comprises a wavelength-selective channel attenuator 402 that is optically coupled to the 3-dB optical splitter 411 via a second optical coupling 407 and an optical output 102 optically coupled to the wavelength-selective channel attenuator 402.

The re-configurable channel dropping de-multiplexer 404 does not comprise the provision for outputting express channels. Therefore, any express channels that may be delivered to the re-configurable channel dropping de-multiplexer 404 are lost from the system. The desired dropped channels are, however, delivered to any one of a plurality of drop ports 116. The re-configurable channel dropping de-multiplexer 404 may comprise, for instance, any one of the de-multiplexer 100 (FIG. 1A), the de-multiplexer 150 (FIG. 1B), the de-multiplexer 170 (FIG. 1C), the de-multiplexer 190 (FIG. 1D), the de-multiplexer 300 (FIG. 3A) or the de-multiplexer 350 (FIG. 3B), provided that there is no output—that is, the nominal output port remains unconnected or unused. The re-configurable channel dropping de-multiplexer 404 may also comprise any system that is equivalent to these re-configurable channel dropping de-multiplexers. The channel dropping de-multiplexer 404 can only drop channels selected from a certain sub-group of the available wavelengths.

The inset boxes 405a-405c within FIG. 4 schematically illustrate the relative intensities of optical channels passing through various portions of the re-configurable channel dropping de-multiplexer system 400. A hypothetical spectrum of sixteen such channels, as received from input 101, is shown in box 405a. Generally, the optical intensity or power will vary from channel to channel as shown in box 405a. The 3-dB optical splitter separates the optical power comprising the channels such that substantially 50% of the optical power of each channel is delivered to the re-configurable channel dropping de-multiplexer 404 via the first optical coupling 415 and the remaining 50% is delivered to the wavelength-selective channel attenuator 402 via the second optical coupling 407. Since the 3-dB optical splitter 411 is not wavelength selective, the relative intensity or power variations between channels remain the same as those in the input signal prior to passing through the 3-dB optical splitter 411. For instance, inset box 405b within FIG. 4 illustrates the spectrum of channels delivered to the re-configurable channel dropping de-multiplexer 404 via the first optical coupling 415. The spectrum of channels delivered to the wavelength-selective channel attenuator 402 via the second optical coupling 407 is similar to that shown in box 405b. It is to be kept in mind that the vertical scales are different among the different inset boxes 405a-405c and thus the relative intensities of channels can only be compared within any individual one of the boxes 405a-405c and cannot be compared between these inset boxes.

The channels that are delivered to the re-configurable channel dropping de-multiplexer 404 via the first optical coupling 415 within the re-configurable channel dropping de-multiplexer system 400 (FIG. 4) comprise the wavelengths of both the desired dropped channels as well as the express channels. The channels delivered to the wavelength-selective channel attenuator 402 also comprise the wavelengths of all the channels, including the express channels as well as the dropped channels. Each dropped channel must ultimately be routed to one of the channel drop ports 116 and each express channel must ultimately be routed to the optical output 102. To avoid inter-channel contamination, no designated express channel should be delivered to any one of the plurality of channel drop ports 116 comprising the re-configurable channel dropping de-multiplexer 404 and no designated dropped channel should pass through the wavelength-selective channel attenuator 402. Still further, it is desirable that any channel power imbalances between the channels must be equalized before delivery to the output 102.

The wavelength-selective channel attenuator 402 provides the capability of independently attenuating the power each of the wavelength channels delivered to it through the second optical coupling 407. This attenuation capability serves to reduce the optical power of express channels whose powers are relatively too strong (relative to other express channels) so as to balance these various optical powers. The attenuation capability also serves to completely attenuate or block the wavelengths of the dropped channels so that these wavelengths do not propagate through the wavelength-selective channel attenuator 402 to the output 102. These wavelength attenuation capabilities of the wavelength-selective channel attenuator 402 are more fully described in greater detail in a following discussion in this document.

The spectrum of channels exiting the wavelength-selective channel attenuator 402 to the optical output 102 is schematically illustrated in inset box 405c of FIG. 4. In the particular operational example relating to FIG. 4, it is assumed that the second and third channels ($\lambda_2$ and $\lambda_3$) comprise the dropped channels and that the remaining channels comprise express channels. By comparing the spectrum of channels shown in box 405c to that shown in box 405a, it may be readily seen that the wavelength-selective channel attenuator 402 completely blocks the passage of the dropped channels, whose positions are seen as gaps in the spectrum of channels in box 405c. Further, the optical powers of the express channels exiting the wavelength-selective channel attenuator 402 are balanced through selective attenuation of channels whose powers are relatively greater upon entry into the wavelength-selective channel attenuator 402.

Figure 5A:
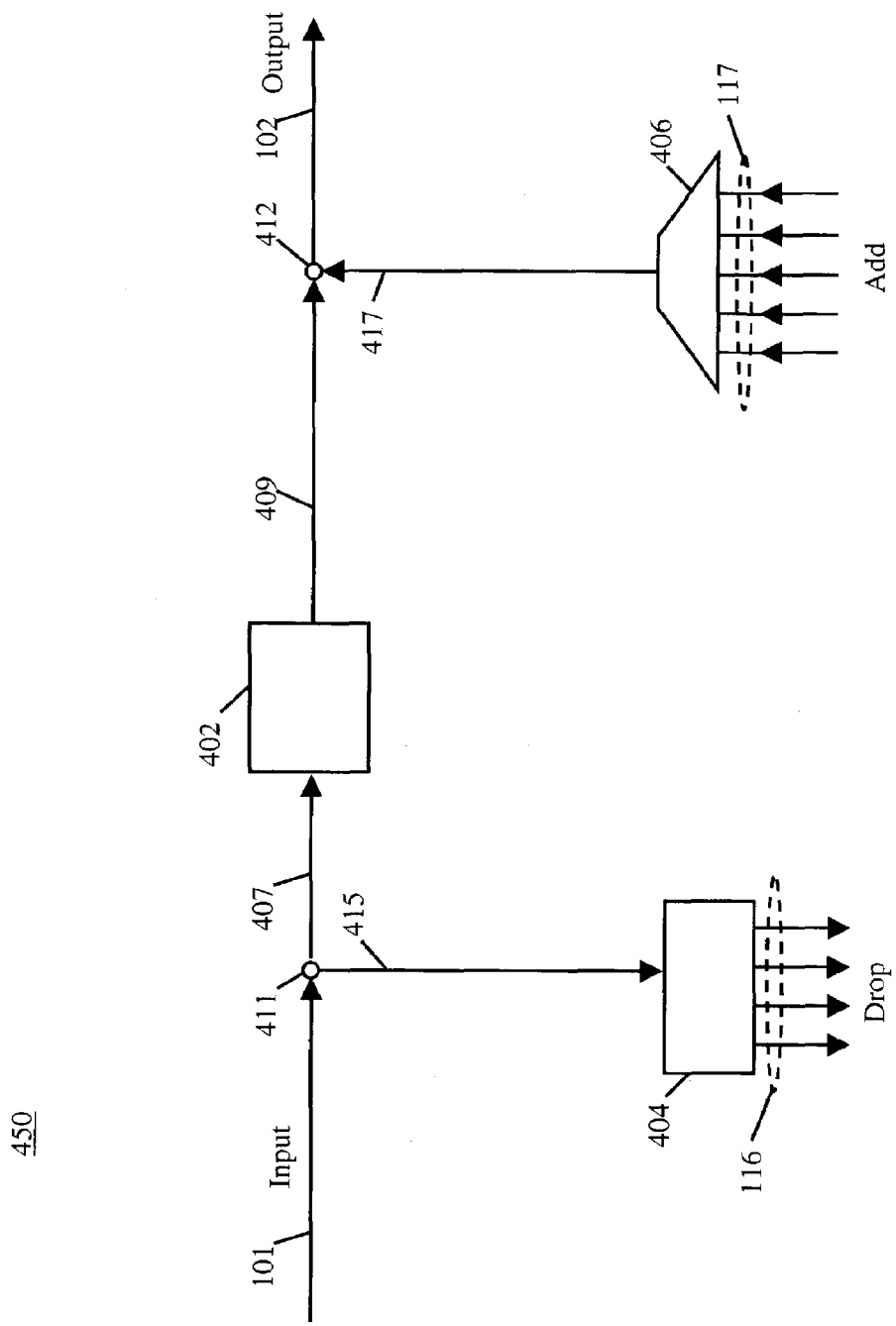
FIG. 5A is an illustration of a first re-configurable channel adding and dropping system that utilizes a re-configurable channel dropping de-multiplexer in accordance with the present invention.

FIG. 5A is an illustration of a first preferred re-configurable channel adding and dropping (R-OADM) system that utilizes a re-configurable channel dropping de-multiplexer in accordance with the present invention. The R-OADM system 450 provides the capability of dropping selected channels as previously described and, further, provides the capability of replacing the wavelengths of the dropped channels with replacement, or added, channels. The wavelength of each added channel corresponds to that of a respective dropped channel. The R-OADM system 450, as shown in FIG. 5A, comprises the following components in common with the re-configurable channel dropping de-multiplexer system 400 (FIG. 4) already described: the optical input 101, the 3-dB optical splitter 411 optically coupled to the optical input 101, the first optical coupling 415 and second optical coupling 407 both optically coupled to the 3-dB optical splitter, the wavelength-selective channel attenuator 402 optically coupled to the 3-dB optical splitter 411 via the second optical coupling 407, the re-configurable channel dropping de-multiplexer 404 optically coupled to the 3-dB optical splitter 411 via the first optical coupling 415 and the optical output 102. As previously described, the re-configurable channel dropping de-multiplexer 404 comprises a plurality of channel drop ports 116.

In contrast to the re-configurable channel dropping de-multiplexer system 400 (FIG. 4), the R-OADM system 450 comprises the additional capability of replacing the dropped channels with replacement "added" channels, which are then combined together with the express channels at the output 102. Accordingly, the R-OADM system 450 comprises additional components comprising: a multiplexer 406, a plurality of channel add ports 117 optically coupled to the multiplexer 406, a third optical coupling 417 optically coupled to the multiplexer 406, a fourth optical coupling 409 optically coupled to the wavelength-selective channel attenuator 402, and a 2×1 optical coupler 412 optically coupled to the third 417 and fourth 409 optical couplings and to the optical output 102.

As previously described in reference to the re-configurable channel dropping de-multiplexer system 400 (FIG. 4), the re-configurable channel dropping de-multiplexer 404 may comprise, for instance, any one of the de-multiplexer 100 (FIG. 1A), the de-multiplexer 150 (FIG. 1B), the de-multiplexer 170 (FIG. 1C), the de-multiplexer 190 (FIG. 1D), the de-multiplexer 300 (FIG. 3A) or the de-multiplexer 350 (FIG. 3B), or any equivalent apparatus or system, provided that the any output port remains unconnected or unused. The multiplexer 406 may comprise any conventional wavelength division multiplexer, of which several examples are known in the art. The multiplexer 406 receives a separate channel to be added from one or more respective members of the plurality of channel add ports 117 and delivers a wavelength division multiplexed optical signal comprising all the added channels to the third optical coupling 417. The 2×1 optical coupler 412 then combines these added channels together with the express channels received from the fourth optical coupling 409 and outputs the combined express and added channels to the output 102.

Figure 5B:
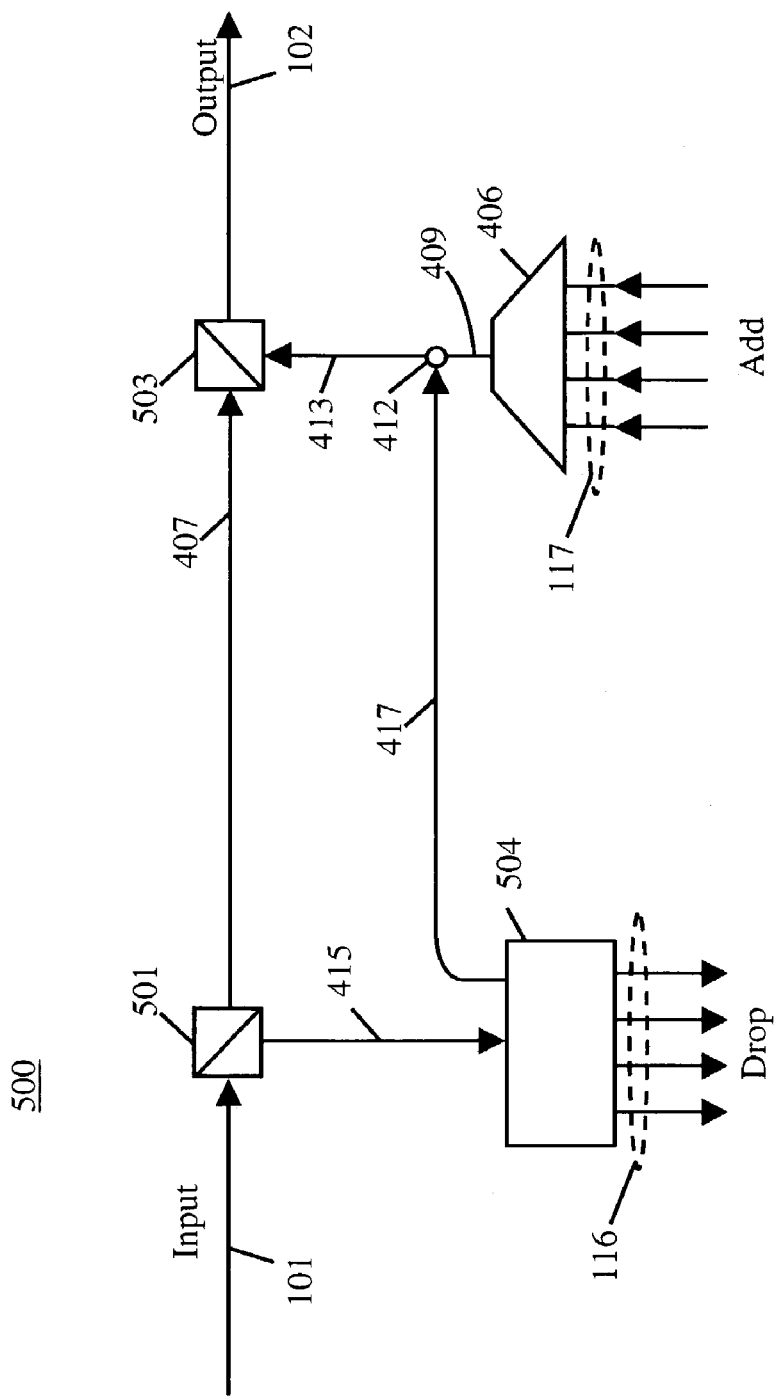
FIG. 5B is an illustration of a second re-configurable channel adding and dropping system that utilizes a re-configurable channel dropping de-multiplexer in accordance with the present invention.
Figure 5C:
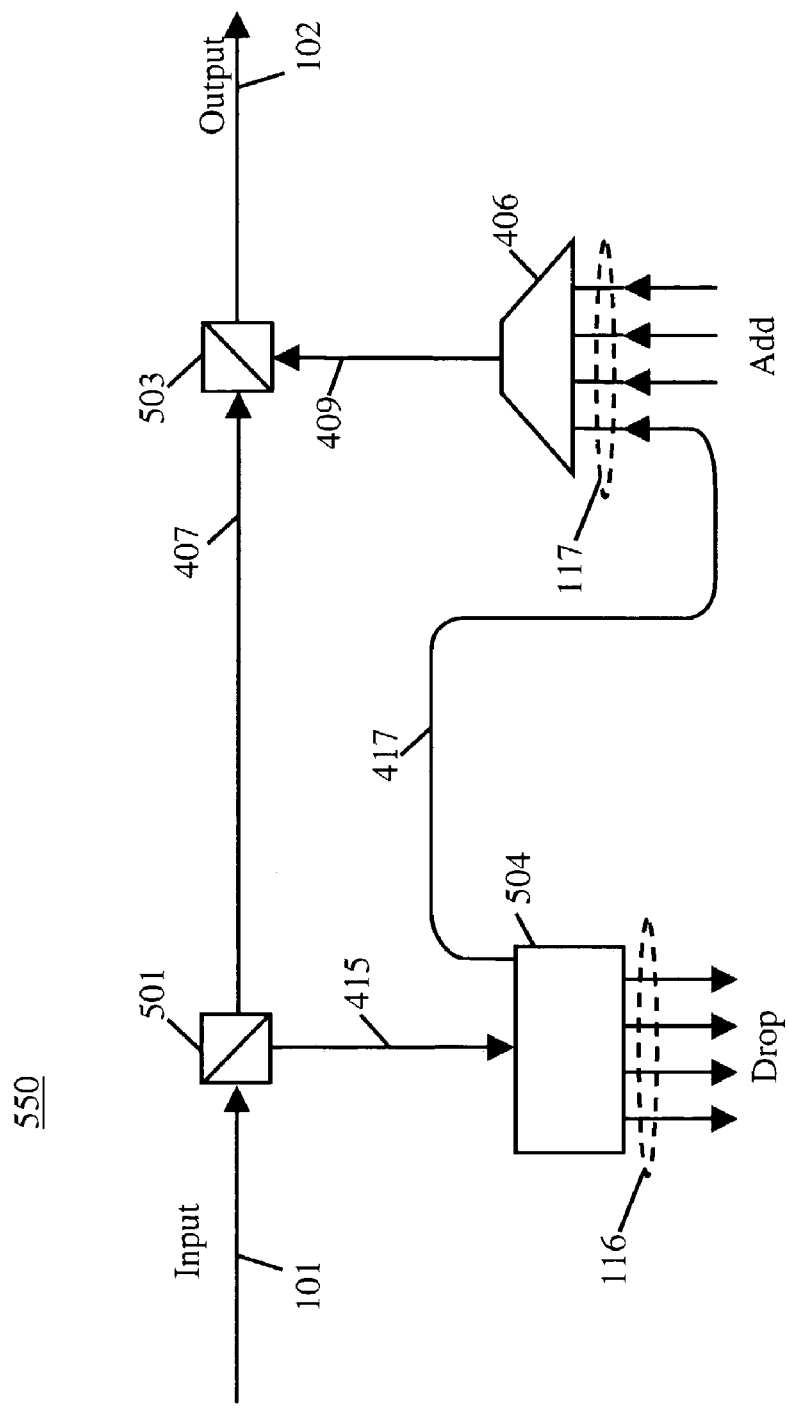
FIG. 5C is an illustration of a third re-configurable channel adding and dropping system that utilizes a re-configurable channel dropping de-multiplexer in accordance with the present invention.

FIGS. 5B and 5C illustrate second and third preferred R-OADM systems, both of which utilize a re-configurable channel dropping de-multiplexer in accordance with the present invention. The R-OADM system 500 and the R-OADM system 550 are useful when it is known that all dropped channels will be selected from among a certain subset of all the channels. The R-OADM system 500 illustrated in FIG. 5B comprises an optical input 101, a channel separator 501 optically coupled to the input 101, a first optical coupling 415 optically coupled to the channel separator 501, a re-configurable channel dropping de-multiplexer 504 optically coupled to the first optical coupling 415 and comprising a plurality of channel drop ports 116, a second optical coupling 407 optically coupled to the channel separator 501 and a channel combiner 503 optically coupled to the second optical coupling 407. The R-OADM system 500 further comprises a third optical coupling 417 optically coupled to the output of the re-configurable channel dropping de-multiplexer 504, a multiplexer 406, a plurality of channel add ports 117 optically coupled to the multiplexer 406, a fourth optical coupling 409 optically coupled to the multiplexer 406, a 2×1 optical coupler 412 optically coupled both the third 417 and fourth 409 optical couplings and a fifth optical coupling 413 optically coupled between the 2×1 optical coupler 412 and the channel combiner 503. The R-OADM system 500 still further comprises an optical output 102 optically coupled to the channel combiner 503.

The channel separator 501 comprising the R-OADM system 500 (FIG. 5B) may comprise a band separator or may comprise an interleaved channel separator. If the channel separator 501 comprises a band separator, than a composite optical signal received at the channel separator 501 from the optical input 101 is separated into a first contiguous band of channels delivered to the first optical coupling 415 and a second contiguous band of channels delivered to the second optical coupling 407. In this case, for instance, if the optical signal received from optical input 101 comprises the eight channels $\lambda_1$-$\lambda_8$, the band separator will separate the channels into a first group comprising the four channels $\lambda_1$-$\lambda_4$ and a second group comprising the four channels $\lambda_5$-$\lambda_8$. In this example, dropped channels are only chosen from amongst the channels $\lambda_1$-$\lambda_4$ and all of the channels $\lambda_5$-$\lambda_8$ comprise express channels. The channel combiner 503 may be structurally equivalent to the channel separator 501, but with the optical signals propagating in an opposite sense within the channel combiner, relative to the channel separator. The channel combiner 503 may, alternatively, comprise an optical coupler, such as a fused-fiber coupler.

If the channel separator 501 within the R-OADM system 500 comprises an interleaved channel separator, than a composite optical signal received at the channel separator 501 from the optical input 101 is separated into a first group of channels comprising every second channel and into a second group of channels comprising the remaining channels, wherein the first and second groups of channels are delivered to the first 415 and the second optical coupling 407, respectively.

The re-configurable channel dropping de-multiplexer 504 within the R-OADM 500 may comprise, for instance, any one of the de-multiplexer 100 (FIG. 1A), the de-multiplexer 150 (FIG. 1B), the de-multiplexer 170 (FIG. 1C), the de-multiplexer 190 (FIG. 1D), the de-multiplexer 300 (FIG. 3A) or the de-multiplexer 350 (FIG. 3B). Alternatively, the re-configurable channel dropping de-multiplexer 504 may comprise any equivalent re-configurable channel dropping system or de-multiplexer. The multiplexer 406 may comprise any conventional wavelength division multiplexer, of which several examples are known in the art. The multiplexer 406 receives a separate channel to be added from one or more respective members of the plurality of channel add ports 117 and delivers a wavelength division multiplexed optical signal comprising all the added channels to the fourth optical coupling 409. These added channels comprise replacement channels for those channels dropped at the plurality of channel drop ports 116 of the re-configurable channel dropping de-multiplexer 504. The wavelength of each added channel corresponds to that of a respective dropped channel. The output of the re-configurable channel dropping de-multiplexer 504, comprising a set of express channels, is directed to the 2×1 optical coupler 412 via the third optical coupling 417. These express channels are combined together with the added channels at the 2×1 optical coupler 412 and these combined channels are delivered to the channel combiner 503 via the fifth optical coupling 413.

The channel combiner 503 comprising the R-OADM 500 (FIG. 5B) receives the second group or band of channels from the channel separator via the second optical coupling 407, receives the added channels and express channels from the 2×1 optical coupler via the fifth optical coupling 413 and combines all these channels into an output composite optical signal delivered to the optical output 102.

The R-OADM system 550 illustrated in FIG. 5C is similar to the R-OADM system 500 (FIG. 5B) except that the third optical coupling 417 delivers the express channels directly to one of the inputs of the multiplexer 406. Thus, there is no requirement for the 2×1 optical coupler and, thus, the fourth optical coupling 409 transfers multiplexed express channels and added channels directly to the channel combiner 503.

The R-OADM system 500 (FIG. 5B) and the R-OADM system 550 (FIG. 5C) both provide the advantage of separating the input signal into two wavelength groups, wherein a first wavelength group comprises, at least in part, all channels which are to be dropped and wherein a second wavelength group does not comprise any of the channels that will be dropped. For instance, in either the system 500 (FIG. 5B) or the system 550 (FIG. 5C), the channel separator 501 divides the input signal into a first group of channels that is delivered to the first optical coupling 415 and into a second group of channels that is delivered to the second optical coupling 407. Only the first such group of channels comprises those wavelengths that are to be dropped, regardless of whether the channel separator 501 comprises a band separator or an interleaved channel separator. The second group of channels comprises all express channels—that is, wavelengths that are not to be dropped. This separation of channel groups enables the user to reconfigure or upgrade the pathways carrying the second group of channels without interrupting the transmission of optical signals or the operation of add and drop operations, within the pathways of the first group of channels.

Figure 6A:
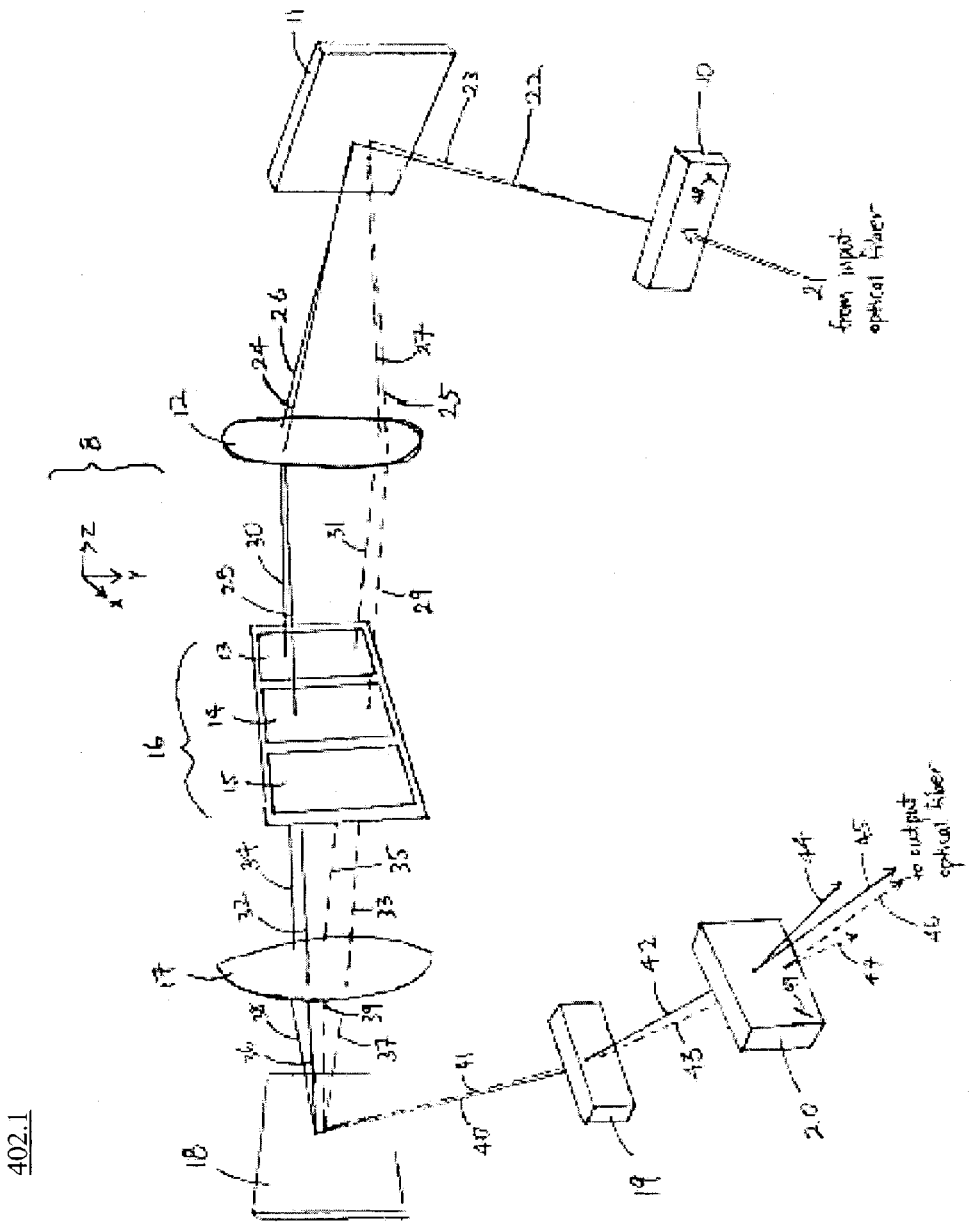
FIG. 6A is an illustration of a first wavelength-selective channel attenuator suitable for use within either the re-configurable channel dropping de-multiplexer system of FIG. 4 or the re-configurable channel adding and dropping system of FIG. 5A.

The discussion is now directed to FIGS. 6A-6D, which illustrate four different examples of wavelength-selective channel attenuators suitable for use within either the re-configurable channel dropping de-multiplexer 400 (FIG. 4) or the R-OADM 450 (FIG. 5A). FIG. 6A depicts a first such wavelength-selective channel attenuator 402.1. The wavelength-selective channel attenuator 402.1 shown in FIG. 6A is disclosed in greater detail in U.S. Pat. No. 6,529,307, incorporated herein by reference in its entirety. The wavelength-selective channel attenuator 402.1 includes a first birefringent wedge 10, a first wavelength dispersive element 11, a lens 12, a polarization modulator 16, a second lens 17, a second wavelength dispersive element 18, a half-wave plate 19, and a second birefringent wedge 20, which are optically coupled as shown in FIG. 6A.

The first birefringent wedge 10 has optic axis 48 lying along the z-direction as defined by coordinate system 8. Thus, when a beam 21 of arbitrarily polarized light travels along the x-axis as defined by coordinate system 8 and strikes the birefringent wedge 10, the beam is split into a first beam 22 polarized in the y-direction and a second beam 23 polarized in the z-direction. Birefringent wedge 10 may be made of any conventional birefringent material, such as calcite, Futile, yttrium vanadate, and yttrium orthovanadate. First wavelength dispersive element 11 and second wavelength dispersive element 18 may be diffraction gratings or prisms. Polarization modulator 16 may be, but is not limited to, a liquid crystal device, and may be substituted by any device that can significantly alter the polarization states of incident channels. Polarization modulator 16 includes a plurality of segments, shown in FIG. 6A as segments 13, 14, and 15 along the x-axis as defined by coordinate system 8. Each segment can be made to change the polarization state of an incident beam. Half-wave plate 19 rotates the polarization direction of an incident beam by ninety degrees. Second birefringent wedge 20 has optic axis 49 lying substantially in the z-direction.

Input signal 21 is typically a collimated broad-band beam of an arbitrary polarization state. The polarization state of input signal 21 may be time-varying. When input signal 21 from an input optical fiber (not shown) strikes birefringent wedge 10, input signal 21 splits into two orthogonally linearly polarized beams, first beam 22 and second beam 23, along the y-axis as defined by coordinate system 8. For clarity of illustration, FIG. 6A shows first beam 22 with a solid line and second beam 23 with a dashed line. If first birefringent wedge 10 has a greater index of refraction along the extraordinary axis (e.g., as in yttrium orthovanadate) than along the ordinary axis, first beam 22 will have a polarization direction perpendicular to optic axis 48 and second beam 23 will have a polarization direction parallel to optic axis 48.

First and second beams 22 and 23 strike wavelength dispersive element 11, which spatially separates first beam 22 by wavelength into channels 24 and 26 and spatially separates second beam 23 into channels 25 and 27, along the x-axis as defined by coordinate system 8. Although only two wavelength channels are shown for clarity, input beam 21 may contain more than two wavelength channels. Lens 12 focuses the incident channels 24, 25, 26 and 27 onto different segments of polarization modulator 16. Lens 12 focuses beams 26 and 27 onto segment 13 of polarization modulator 16 as converging channels 30 and 31, respectively. Also lens 12 focuses beams 24 and 25 onto segment 14 of polarization modulator 16 as converging channels 28 and 29, respectively. Each of segments 13, 14 and 15 can be set to change the polarization state of incident beams in a desired manner. After passing through segments 13 and 14, channels 28 and 30, which are assumed to be polarized in a direction perpendicular to optic axis 48 as mentioned above, may become elliptically polarized channels 32 and 34, respectively. Similarly, channels 29 and 31, which are assumed to be polarized in a direction parallel to optic axis 48, may become elliptically polarized channels 33 and 35 after passing through segments 13 and 14. Channels 32, 33, 34 and 35 strike second lens 17, which collimates channels 32, 33, 34, and 35 to form collimated channels 36, 37, 38 and 39. Collimation may be achieved by positioning lens 17 a focal length away from polarization modulator 16 in the particular medium between lens 17 and polarization modulator 16. The term "focal length", as used herein, refers to the focal length of lens 17. Collimated channels 36, 37, 38 and 29 strike second wavelength dispersive element 18, which recombines the channels into output beams 40 and 41. In the embodiment shown in FIG. 6A, channels 36 and 38 are combined into first output beam 40, and channels 37 and 39 are combined into second output beam 41. First and second output beams 40 and 41 are generally elliptically polarized.

Output beams 40 and 41 each contain two orthogonal polarization components. Of the two polarization components in output beams 40 and 41, the polarization components that result from passing through polarization modulator 16 are rotated ninety degrees by half-waveplate 19 so as to form output beams 42 and 43. Output beams 42 and 43 enter second birefringent wedge 20, which has optic axis 49 lying substantially in the z-direction as shown in FIG. 6A and defined by coordinate system 8. Birefringent wedge 20 splits output beam 42 into output signals 44 and 45 according to polarization states. Similarly, birefringent wedge splits output channel 43 into output signals 46 and 47 according to polarization states. Output signals 45 and 46 propagate in a parallel direction with respect to each other, and are therefore both coupled into an output fiber (not shown). Output signals 44 and 47, which constitute light having the original polarization states of first and second input beams 22 and 23, propagate at an angle with respect to output signals 45 and 46. Output signals 44 and 47 are therefore not coupled into an optical fiber, resulting in the attenuation of the output signal. By controlling the segments of polarization modulator 16, the intensity of output signals 45, 46, 47 and 48 can be modulated.

Figure 6B:
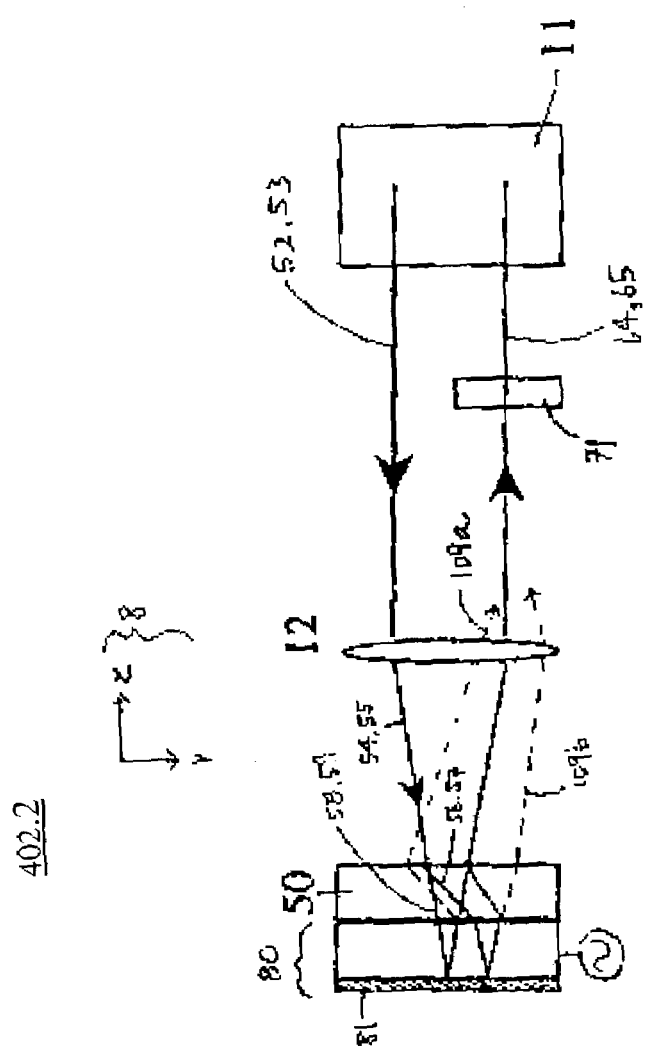
FIG. 6B is an illustration of a second wavelength-selective channel attenuator suitable for use within either the re-configurable channel dropping de-multiplexer system of FIG. 4 or the re-configurable channel adding and dropping system of FIG. 5A.

FIG. 6B shows another wavelength-selective channel attenuator 402.2 suitable for use within a re-configurable channel dropping de-multiplexer in accordance with the present invention. The wavelength-selective channel attenuator 402.2 shown in FIG. 6B is disclosed in greater detail in the aforementioned U.S. Pat. No. 6,529,307, incorporated herein by reference in its entirety. The wavelength-selective channel attenuator 402.2 uses reflective polarization modulator 80, instead of the previously described polarization modulator 16, wavelength dispersive element 11, birefringent beam displacer 50, lens 12 and a birefringent wave plate or wedge (not shown, but analogous to birefringent wedge 10 of FIG. 6A). Reflective polarization modulator 80, which has a reflective surface 81, is a waveplate with retardation tunable in the range between zero and quarter wavelength. The optic axis of the wave plate lies at a 45-degree angle to both the x-axis and the y-axis as defined as defined by coordinate system 8. When input channels 52 and 53 strike first birefringent beam displacer 50, the portion that is polarized in the x-direction as defined by coordinate system 8 (i.e., beams 58 and 59) passes through without displacement, while the portion that is polarized in the y-direction (beams 56 an 57) is displaced. When retardation for a channel is tuned to zero, reflective polarization modulator 80 does not change the polarization of incident channels. Thus, when retardation is set at zero, channels 52 and 53 (which become focussed channels 54 and 55 after passing through lens 12) travel through birefringent beam displacer 50 and reflective polarization modulator 80 in the path shown with solid lines (beams 64, 65), and the channels are not attenuated. On the other hand, when retardation is set at a non-zero value, reflective polarization modulator 80 changes the polarization of incident beams. When the polarization is changes, the reflected channels each split into two beams upon passing through birefringent beam displacer 50 on their way to wavelength dispersive element 11. The portion of beam 58 that became polarized in the y-direction as defined by coordinate system 8 is displaced along the y-direction, as shown by dashed line 109a. The portion of beam 56 that became polarized in the x-direction as defined by coordinate system 8, on the other hand, is not displaced when passing through first birefringent beam displacer 50, as shown by dashed line 109b. Beams depicted by dashed lines 109a and 109b propagate in different directions from beams 64 and 65, and are not coupled into the output fiber. Elimination of the two beams leads to channel attenuation, and the degree of attenuation is controlled by tuning reflective modulator 80.

The optional half-wave waveplate 71 with an optic axis aligned 45 degrees to both the x-axis and the y-axis as defined by coordinate system 8 can be used to eliminate polarization dependent loss (PDL). Half-wave waveplate 71 rotates the polarization of an incident channel to balance the diffraction efficiencies of the grating. Thus, the PDL caused by the grating can be eliminated.

Figure 6C:
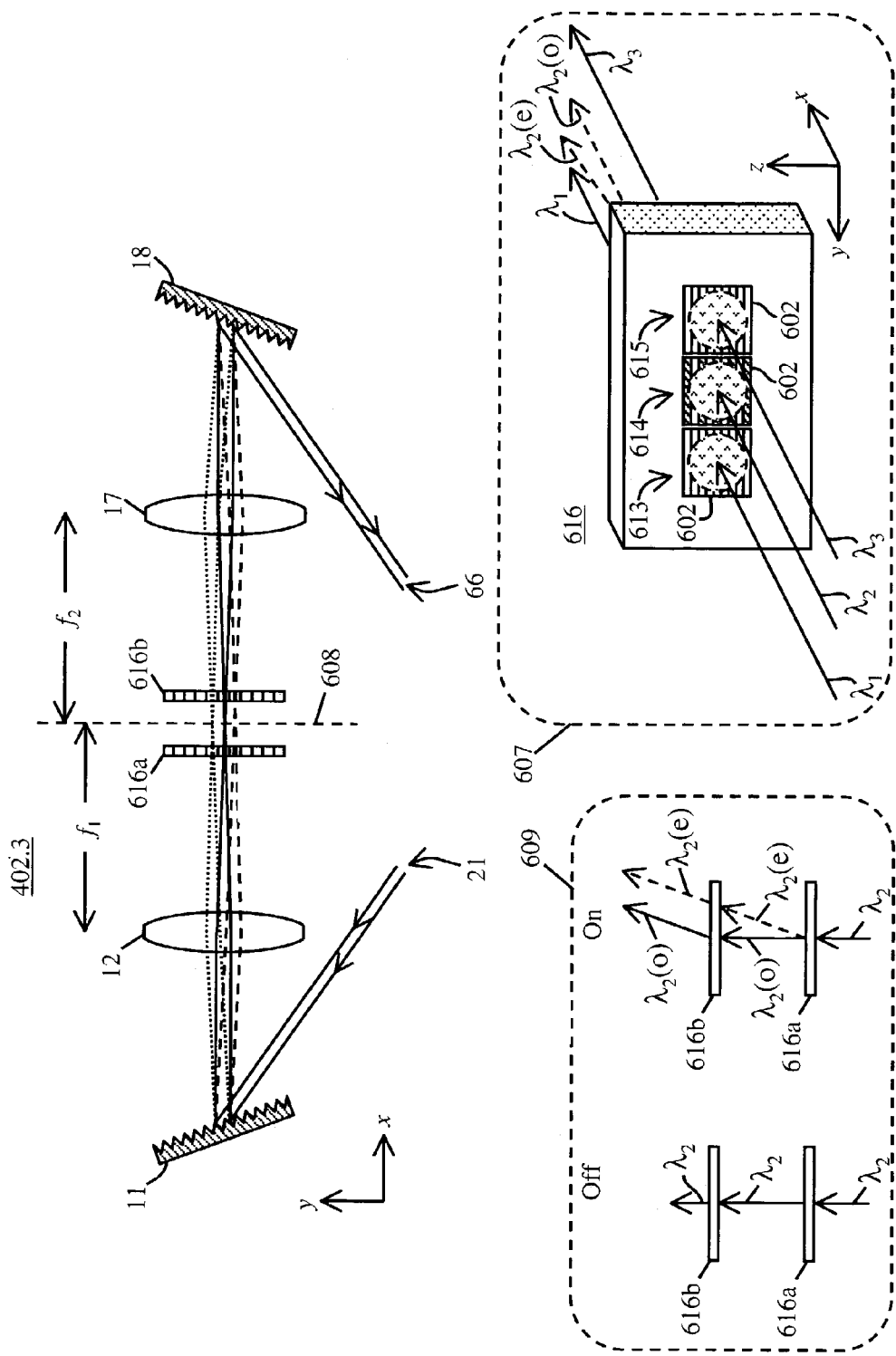
FIG. 6C is an illustration of a third wavelength-selective channel attenuator suitable for use within either the re-configurable channel dropping de-multiplexer system of FIG. 4 or the re-configurable channel adding and dropping system of FIG. 5A.
Figure 6D:
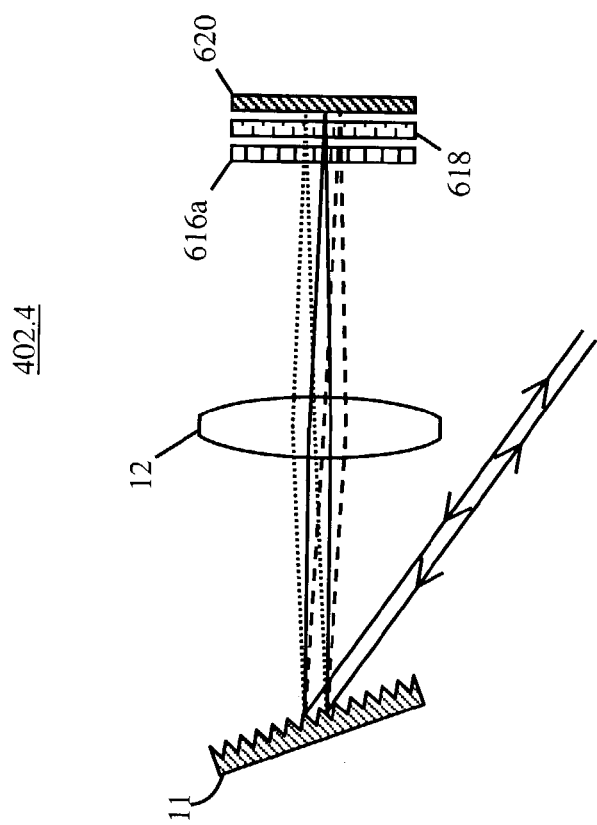
FIG. 6D is an illustration of a fourth wavelength-selective channel attenuator suitable for use within either the re-configurable channel dropping de-multiplexer system of FIG. 4 or the re-configurable channel adding and dropping system of FIG. 5A.
Figure 7:
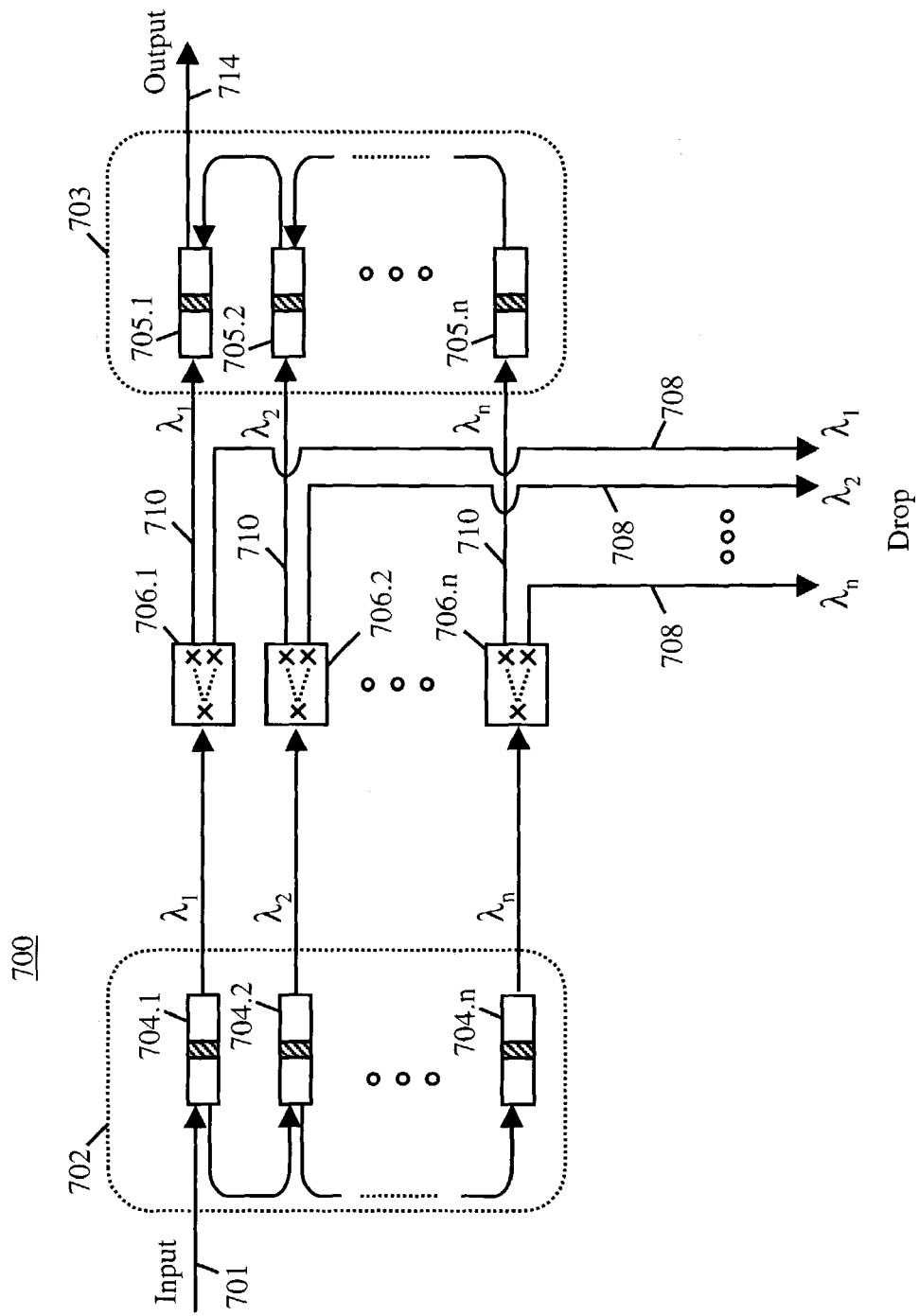
FIG. 7 is a diagram of a conventional re-configurable channel dropping de-multiplexer.

FIGS. 6C-6D provide illustrations, respectively, of a third and a fourth wavelength-selective channel attenuator that are suitable for use within an re-configurable channel dropping de-multiplexer in accordance with the present invention. The wavelength-selective channel attenuator 402.3, shown in FIG. 6C, and the wavelength-selective channel attenuator 402.4, shown in FIG. 6D, are disclosed in greater detail in a co-pending U.S. Provisional Patent Application Ser. No.

60/432,114, incorporated herein by reference in its entirety, filed Dec. 10, 2002 in the names of H. Yuan and S. Peng and titled "Method, Apparatus and System for a Variable Optical Attenuator Utilizing a Liquid Crystal Phase Grating".

The wavelength-selective channel attenuator 402.3 (FIG. 6C) comprises a first wavelength dispersive element 11, a first lens 12 optically coupled to the first wavelength dispersive element and a first segmented liquid crystal device 616a optically coupled to the first lens 12. The wavelength-selective channel attenuator 402.3 further comprises a second segmented liquid crystal device 616b optically coupled to the first segmented liquid crystal device 616a, a second lens 17 optically coupled to the second segmented liquid crystal device 616b and a second wavelength dispersive element 18 optically coupled to the second lens 17 oppositely to the liquid crystal device 616b. Preferably, each of the first wavelength dispersive element 11 and the second wavelength dispersive element 18 comprises a diffraction grating or a prism. Further, as described in greater detail in the following discussion, each segment of the first segmented liquid crystal device 616a and of the second segmented liquid crystal device 616b comprises a different respective independently controllable phase grating structure 602. Such liquid crystal phase gratings are well-known in the art.

FIG. 6C represents pathways through the wavelength-selective channel attenuator 402.3 in a state in which it does not provide any attenuation. A collimated composite optical signal 21 is received into the apparatus 402.3. The collimated signal 21 may be provided by an optical fiber and collimator (not shown). The collimated composite optical signal 21 is then delivered to the first wavelength dispersive element 11, whereat its component channels are separated from one another according to their wavelengths by diffraction. The pathways of three such separated channels are shown by dotted, solid and dashed lines, respectively, in FIG. 6C. These separated channels are then focused by the first lens 12 such that each channel passes through a different respective segment of the first liquid crystal device 616a and, also, such that each channel passes through a different respective segment of the second liquid crystal device 616b.

Preferably, the first lens 12 and the second lens 17 are disposed at their respective focal distances, $f_1$ and $f_2$, from a hypothetical plane 608 midway between the two segmented liquid crystal devices 616a-616b. After passing through their focal points between the two liquid crystal devices, the lights of the separated channels once again diverge and are re-collimated by the second lens 17. The collimated lights of the channels are then re-combined into a composite optical signal 66 by diffraction at the second wavelength dispersive element 18.

A detailed diagram of a segmented liquid crystal device 616, which may be either the first 616a or the second 616b segmented liquid crystal device is shown in the inset box 607 of FIG. 6C. Each of the different segments of the device 616a receives a different respective channel from the first wavelength dispersive element 11. Three segments are illustrated in inset box 607, the first segment 613 receiving the channel $\lambda_1$, the second segment 614 receiving the channel $\lambda_2$ and the third segment 615 receiving the channel $\lambda_3$. The path of the light of each of these channels is represented by rays entering and exiting the device 616a in inset box 607; the position of each channel upon the device 616a is represented by a respective spot. Generally, the number of segments comprising the device 616a will correspond to the number of channels input to the apparatus 402.3 from an input composite optical signal, which may be significantly greater than the three channels shown.

Each segment of the device 616 comprises a different respective independently controllable phase grating structure 602. Each phase grating structure 602 comprising one of the segments 613-615 of the device 616 may be configured so as to diffract light out of the plane of the separated channels. The operation of the phase grating structure 602 of each segment is independent of that of every other segment comprising the device 616. If a particular segment does not so diffract light, the channel directed to that segment does not incur attenuation at the segment. However, if the segment does diffract a portion or all of the light comprising the channel, then the channel incurs attenuation at the segment. In the example shown in the inset box 607 (FIG. 6C), the channels $\lambda_1$, $\lambda_2$ and $\lambda_3$ lie in the x-y plane, which is the dispersion plane of the first wavelength dispersive element 11. The phase grating structure 602 of each of the segments 613-615 is configured so, that when light is diffracted, this diffracted light passes out of this plane—that is, the light's propagation vector has a directional component in the direction of the z-axis after passing through the grating structure. In the example of inset box 607, this is accomplished by orienting the strips of each phase grating structure parallel to the x-y plane.

In the example shown in inset box 607, the $\lambda_2$ channel passes through the segment 614 comprising a phase grating structure configured so as to diffract light, whereas the $\lambda_1$ and $\lambda_3$ channels pass through segments 613 and 615 comprising phase gratings configured so as to not diffract light. Thus, the $\lambda_2$ channel will be attenuated by the liquid crystal device 616 whereas the $\lambda_1$ and $\lambda_3$ channels pass through their respective segments without attenuation.

The diffraction—and therefore the attenuation—of the $\lambda_2$ (or any other) channel by the liquid crystal device 616 only applies to a certain polarization component. If the first segmented liquid crystal device 616a diffracts (and, thereby, attenuates) a certain first polarization component, then the second liquid crystal device 616b is configured or oriented so that it may attenuate the remaining polarization component that is polarized orthogonally to the first polarization component. This two-stage attenuation process is shown schematically in inset box 609 of FIG. 6C, using the attenuation of channel $\lambda_2$ as an example. Although the inset box 609 uses the channel $\lambda_2$ as an example, the two-stage attenuation process may apply to any and all channels. Inset box 609 of FIG. 6C illustrates both an "Off" state, within which channel $\lambda_2$ is neither diffracted nor attenuated by either the first segmented liquid crystal device 616a or the second segmented liquid crystal device 616b and an "On" state, within which a polarization component $\lambda_2(e)$ is attenuated at device 616a and a second polarization component $\lambda_2(o)$ is attenuated at device 616b. This two-stage attenuation process ensures that the total attenuation is high and that no unwanted polarization components of channels "leak" through the attenuator 402.3 when it is desired to completely attenuate such channels.

The wavelength-selective channel attenuator 402.4, shown in FIG. 6D, is a wholly reflective apparatus. The wavelength-selective channel attenuator 402.4 comprises the same first wavelength dispersive element 11, first lens 12 and first segmented liquid crystal device 616a as already described in reference to the wavelength-selective channel attenuator 402.3 (FIG. 6C). However, the wavelength-selective channel attenuator 402.4 (FIG. 6D) comprises a quarter-wave ($\lambda/4$) plate 618 optically coupled to the first segmented liquid crystal device 616a at a side opposite to the lens 12 and further comprises a reflector 620 optically coupled to the quarter-wave plate 618 at a side opposite to the segmented liquid crystal device 616a.

The λ/4 plate 618 comprising the wavelength-selective channel attenuator 402.4 (FIG. 6D) receives at least a portion of the light comprising each channel from each respective segment of the segmented liquid crystal device 616a. If the segment is configured so as to not diffract any light of the channel, then the segment passes substantially all of the channel light to the λ/4 plate 618. However, if the segment is configured to diffract light of the channel, thereby attenuating the channel, then the diffracted light comprises a certain polarization component and the light passing through to the λ/4 plate 618 predominantly comprises a polarization component polarized orthogonally to the diffracted polarization component. The plurality of channel lights that are transmitted through the λ/4 plate 618 travel to the reflector 620. The reflector reflects these channel lights back to and through the λ/4 plate 618 and the segmented liquid crystal device 616a.

The λ/4 plate 618 and the reflector 620 comprising the wavelength-selective channel attenuator 402.4 (FIG. 6D) operate so as to reflect a polarization component of each channel of the plurality of channels back through the same respective segment of the segmented liquid crystal device 616a through which it previously passed. Further, the λ/4 plate 618 and the reflector 620 operate in such a way that, after two passes through the λ/4 plate 618, with the first pass being in a forward direction and the second pass being in a reverse direction, the linear polarization of said polarization component is rotated by 90 degrees during the second pass, relative to its orientation during the first pass. This polarization rotation ensures that, if a certain polarization component of a channel is attenuated during the first, forward pass through a segment of the segmented liquid crystal device 616a, then the remaining polarization component of the channel will also be attenuated during the reverse pass through the segment.

As described previously, in reference to the wavelength-selective channel attenuator 402.3 (FIG. 6C), each phase grating structure of the segmented liquid crystal device 616a is configured so as to operate independently of every other phase grating structure. Each phase grating structure can diffract light out of the plane of the separated channels. A first polarization component of a channel may be so diffracted during a first pass through the segmented liquid crystal device 616a and a second polarization component may be so diffracted after being reflected by the reflector 620 back through the λ/4 plate 618 to the liquid crystal device 616a. Any non-diffracted and, therefore, non-attenuated channels are returned back through the lens 12 to the wavelength dispersive element 11 where they are recombined into a WDM composite optical signal by diffraction.

An apparatus, system and method for an improved re-configurable optical channel dropping de-multiplexer have been disclosed. An exemplary first re-configurable channel dropping de-multiplexer in accordance with the present invention comprises an optical input, an optical output, a first 1×2 optical switch optically coupled to the input, a second 1×2 optical switch optically coupled to the output, a plurality of 2×2 optical switches optically coupled between the first and second 1×2 optical switches, a plurality of inter-switch optical couplings optically coupled between each pair of adjacent optical switches, a plurality of channel band pass filter assemblies, a plurality of filter input couplings optically coupled between a respective channel band pass filter assembly and a logically preceding optical switch, a plurality of filter output couplings optically coupled between a respective one of the channel band pass filter assemblies and a logically following optical switch and a plurality of channel drop ports, wherein each channel drop port is optically coupled to a respective channel band pass filter assembly. A re-configurable channel dropping de-multiplexer in accordance with the present invention provides the advantage, over prior art, of lower express channel insertion loss, since, in the present invention, these express channels are not required to be transmitted through a channel band pass filter.

Although the present invention has been disclosed in accordance with the embodiments shown, one of ordinary skill in the art will readily recognize that there could be variations to the embodiments shown and those variations would be within the spirit and scope of the present invention. Accordingly, many modifications may be made by one of ordinary skill in the art without departing from the scope of the invention, which is defined by the claims appended hereto.

We claim:

1. A re-configurable optical channel dropping de-multiplexer, comprising:
   an 1×2 optical switch having an input, a first output, and a second output, the input of the 1×2 optical switch receiving an optical input comprising a plurality of channels;
   a first 2×2 optical switch having a first input, a second input, a first output, and a second output, the first input of the first 2×2 optical switch optically coupled to the first output of 1×2 optical switch; and
   a first channel band pass filter assembly having an input, a first output, and a second output, the input of the first channel band pass filter assembly optically coupled to the 1×2 optical switch, the first output of the first channel band pass filter assembly transmitting a first channel in the plurality of channels, the second output of the first channel band pass filter assembly reflecting all other channels except for the first channel to the first 2×2 switch;
   wherein, in a first configuration, the input of the 1×2 optical switch is optically coupled to the first channel band pass filter assembly, the first channel band pass filter assembly transmitting the first channel in the plurality of channels to the first output of the first channel band pass filter assembly, the first channel band pass filter assembly reflecting all other channels except for the first channel to the second output of the first channel band pass filter assembly;
   wherein, in a second configuration, the input of the 1×2 optical switch is optically coupled to the first 2×2 optical switch for passing through all of the a plurality of channels.

2. The apparatus of claim 1, further comprising:
   a second 2×2 optical switch having a first input, a second input, a first output, and a second output, the first input of the second 2×2 optical switch optically coupled to the first output of the first 2×2 switch; and
   a second channel band pass filter assembly having an input coupled to the 2×2 optical switch, a first output for transmitting a second channel in the plurality of channels, and a second output for reflecting other channels except for the second channel to the second input of the second 2×2 optical switch.

3. The apparatus of claim 2, further comprising:
   a third 2×2 optical switch having a first input, a second input, a first output, and a second output, the first input of the third 2×2 optical switch optically coupled to the first output of second 2×2 optical switch; and a third band pass filter assembly having an input optically coupled to the second 2×2 optical switch, a first output for transmitting a third channel in the plurality of channels, and a second output for reflecting other channels except for the third channel to the second input of the third 2×2 optical switch.

4. The apparatus of claim 3, further comprising:

a 2×1 optical switch having a first input, a second input, and an output, and the first input of the 2×1 optical switch optically coupled to the first output of third 2×2 optical switch; and a fourth band pass filter assembly having an input optically coupled to the third 2×2 optical switch, a first output for transmitting a fourth channel in the plurality of channels, and a second output for reflecting other channels except for the fourth channel to the second input of the 2×1 optical switch.

5. The apparatus of claim 4, all channels in the plurality of channels being transmitted through the demultiplexer wherein:

in the 1×2 switch, the input is optically connected to the first output;

in the first 2×2 switch, the first input is optically connected to the first output;

in the second 2×2 switch, the first input is optically connected to the first output;

in the third 2×2 switch, the first input is optically connected to the first output; and in the 2×1 switch, the first input is optically connected to the output.

6. The apparatus of claim 4, the first channel being dropped and all other channels in the plurality of channels being transmitted through the demultiplexer wherein:

in the 1×2 switch, the input is optically connected to the second output;

in the first 2×2 switch, the second input is optically connected to the first output;

in the second 2×2 switch, the first input is optically connected to the first output;

in the third 2×2 switch, the first input is optically connected to the first output; and in the 2×1 switch, the first input is optically connected to the output.

7. The apparatus of claim 4, the second channel being dropped and all other channels in the plurality of channels being transmitted through the demultiplexer wherein:

in the 1×2 switch, the input is optically connected to the first output;

in the first 2×2 switch, the first input is optically connected to the second output;

in the second 2×2 switch, the second input is optically connected to the first output;

in the third 2×2 switch, the first input is optically connected to the first output; and in the 2×1 switch, the first input is optically connected to the output.

8. The apparatus of claim 4, the third channel being dropped and all other channels in the plurality of channels being transmitted through the demultiplexer wherein:

in the 1×2 switch, the input is optically connected to the first output;

in the first 2×2 switch, the first input is optically connected to the first output;

in the second 2×2 switch, the first input is optically connected to the second output;

in the third 2×2 switch, the second input is optically connected to the first output; and in the 2×1 switch, the first input is optically connected to the output.

9. The apparatus of claim 4, the fourth channel being dropped and all other channels in the plurality of channels being transmitted through the demultiplexer wherein:

in the 1×2 switch, the input is optically connected to the first output;

in the first 2×2 switch, the first input is optically connected to the first output;

in the second 2×2 switch, the first input is optically connected to the first output;

in the third 2×2 switch, the first input is optically connected to the first output; and in the 2×1 switch, the second input is optically connected to the output.

10. The apparatus of claim 4, the first and second channels being dropped and all other channels in the plurality of channels being transmitted through the demultiplexer wherein:

in the 1×2 switch, the input is optically connected to the second output;

in the first 2×2 switch, the second input is optically connected to the second output;

in the second 2×2 switch, the second input is optically connected to the first output;

in the third 2×2 switch, the first input is optically connected to the first output; and in the 2×1 switch, the first input is optically connected to the output.

11. The apparatus of claim 4, the first and third channels being dropped and all other channels in the plurality of channels being transmitted through the demultiplexer wherein:

in the 1×2 switch, the input is optically connected to the second output;

in the first 2×2 switch, the second input is optically connected to the first output;

in the second 2×2 switch, the first input is optically connected to the second output;

in the third 2×2 switch, the second input is optically connected to the first output; and in the 2×1 switch, the first input is optically connected to the output.

12. The apparatus of claim 4, the first and fourth channels being dropped and all other channels in the plurality of channels being transmitted through the demultiplexer wherein:

in the 1×2 switch, the input is optically connected to the second output;

in the first 2×2 switch, the second input is optically connected to the first output;

in the second 2×2 switch, the second input is optically connected to the first output;

in the third 2×2 switch, the first input is optically connected to the second output; and in the 2×1 switch, the second input is optically connected to the output.

13. The apparatus of claim 4, the second and third channels being dropped and all other channels in the plurality of channels being transmitted through the demultiplexer wherein:

in the 1×2 switch, the input is optically connected to the first output;

in the first 2×2 switch, the first input is optically connected to the second output;

in the second 2×2 switch, the first input is optically connected to the second output;

in the third 2×2 switch, the second input is optically connected to the first output; and in the 2×1 switch, the first input is optically connected to the output.

14. The apparatus of claim 4, the second and fourth channels being dropped and all other channels in the plurality of channels being transmitted through the demultiplexer wherein:

in the 1×2 switch, the input is optically connected to the first output;

in the first 2×2 switch, the first input is optically connected to the second output;

in the second 2×2 switch, the second input is optically connected to the first output;

in the third 2×2 switch, the first input is optically connected to the first output; and in the 2×1 switch, the second input is optically connected to the output.

15. The apparatus of claim 4, the first, second, and third channels being dropped and all other channels in the plurality of channels being transmitted through the demultiplexer wherein:

in the 1×2 switch, the input is optically connected to the second output;

in the first 2×2 switch, the second input is optically connected to the second output;

in the second 2×2 switch, the second input is optically connected to the second output;

in the third 2×2 switch, the second input is optically connected to the first output; and in the 2×1 switch, the first input is optically connected to the output.

16. The apparatus of claim 4, the first, second, and fourth channels being dropped and all other channels in the plurality of channels being transmitted through the demultiplexer wherein:

in the 1×2 switch, the input is optically connected to the second output;

in the first 2×2 switch, the second input is optically connected to the second output;

in the second 2×2 switch, the second input is optically connected to the first output;

in the third 2×2 switch, the first input is optically connected to the first output; and in the 2×11 switch, the second input is optically connected to the output.

17. The apparatus of claim 4, the first, third, and fourth channels being dropped and all other channels in the plurality of channels being transmitted through the demultiplexer wherein:

in the 1×2 switch, the input is optically connected to the second output;

in the first 2×2 switch, the second input is optically connected to the first output;

in the second 2×2 switch, the first input is optically connected to the second output;

in the third 2×2 switch, the second input is optically connected to the second output; and in the 2×1 switch, the second input is optically connected to the output.

18. The apparatus of claim 4, the second, third, and fourth channels being dropped and all other channels in the plurality of channels being transmitted through the demultiplexer wherein:

in the 1×2 switch, the input is optically connected to the first output;

in the first 2×2 switch, the first input is optically connected to the second output;

in the second 2×2 switch, the second input is optically connected to the second output;

in the third 2×2 switch, the second input is optically connected to the second output; and in the 2×1 switch, the second input is optically connected to the output.

19. The apparatus of claim 4, the first, second, third, and fourth channels being dropped and all other channels in the plurality of channels being transmitted through the demultiplexer wherein:

in the 1×2 switch, the input is optically connected to the second output;

in the first 2×2 switch, the second input is optically connected to the second output;

in the second 2×2 switch, the second input is optically connected to the second output;

in the third 2×2 switch, the second input is optically connected to the second output; and in the 2×1 switch, the second input is optically connected to the output.

20. The apparatus claim 4, further comprising a routing optical switch coupled to the first output of at least one channel band pass filter assembly, the routing optical switch having at least one input for receiving one or more dropped channels and routing the one or more dropped channels to at least one output of the routing optical switch.

21. The apparatus of claim 3, further comprising a routing optical switch coupled to the first output of at least one channel band pass filter assembly, the routing optical switch having at least one input for receiving one or more dropped channels and routing the one or more dropped channels to at least one output of the routing optical switch.

22. The apparatus of claim 2, further comprising a routing optical switch coupled to the first output of at least one channel band pass filter assembly, the routing optical switch having at least one input for receiving one or more dropped channels and routing the one or more dropped channels to at least one output of the routing optical switch.

23. The apparatus of claim 1, further comprising a routing optical switch coupled to the first output of at least one channel band pass filter assembly, the routing optical switch having at least one input for receiving one or more dropped channels and routing the one or more dropped channels to at least one output of the routing optical switch.

* * * * *